United States Patent
Furtner et al.

(10) Patent No.: US 9,837,917 B1
(45) Date of Patent: Dec. 5, 2017

(54) X-CAP. DISCHARGE METHOD FOR FLYBACK CONVERTER

(71) Applicant: Infineon Technologies Austria AG, Villach (AT)

(72) Inventors: Wolfgang Furtner, Fuerstenfeldbruck (DE); Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/220,026

(22) Filed: Jul. 26, 2016

(51) Int. Cl.
*H02M 3/335* (2006.01)
*H02M 1/44* (2007.01)

(52) U.S. Cl.
CPC ......... *H02M 3/33523* (2013.01); *H02M 1/44* (2013.01)

(58) Field of Classification Search
CPC ......... H02M 3/33507; H02M 3/33523; H02M 3/33592; H02M 1/20; H02M 1/22; H02M 1/30; H02M 1/32; H02M 1/4208; H02M 7/006; H02M 7/217; H02M 7/445; H02M 7/51; H02M 2001/0032; Y02B 70/126; Y02B 70/1475
USPC ........... 363/97, 108, 114, 121, 123, 125–127
See application file for complete search history.

(56) References Cited

U.S. PATENT DOCUMENTS

| | | | | | |
|---|---|---|---|---|---|
| 5,424,933 | A | * | 6/1995 | Illingworth | H02M 3/33546 363/21.02 |
| 5,982,640 | A | * | 11/1999 | Naveed | H02M 3/33523 363/21.15 |
| 2003/0174521 | A1 | * | 9/2003 | Batarseh | H02M 1/4258 363/21.12 |
| 2012/0314456 | A1 | * | 12/2012 | Lanni | H02M 1/4258 363/21.02 |

OTHER PUBLICATIONS

FAN6757—mWSaver PWM Controller, Fairchild Semiconductor, www.fairchildsemi.com, Rev. 1.0.1, Nov. 2013, 17 pages.
HF81 X Capacitor Bleeder, MPS the Future of Analog IC Technology, Rev. L14, www.monolithicPower.com, Sep. 28, 2015. 10 pages.
TEA1708T GreenChip X capacitor discharge IC, Innovation by NXP, Green Chip, Rev. 1-25, Product data sheet, Sep. 25, 2013, 11 pages.

* cited by examiner

*Primary Examiner* — Yemane Mehari
(74) *Attorney, Agent, or Firm* — Slater Matsil, LLP

(57) ABSTRACT

In accordance with a preferred embodiment of the present invention, a method of operating a switch-mode power supply includes: receiving a dropout detection signal from a dropout detection circuit coupled to an input of the switch-mode power supply; and discharging an input capacitor coupled to the input of the switch-mode power supply via a switching transistor having a first load path coupled to the input capacitor through an inductive element.

38 Claims, 18 Drawing Sheets

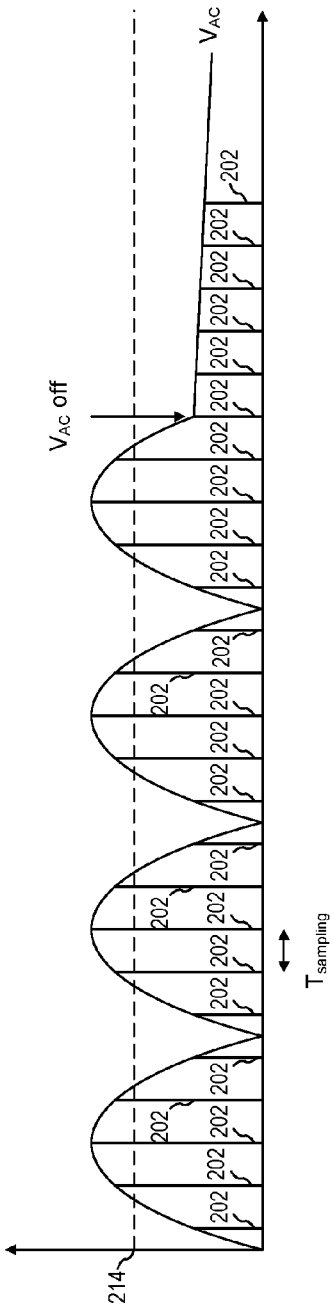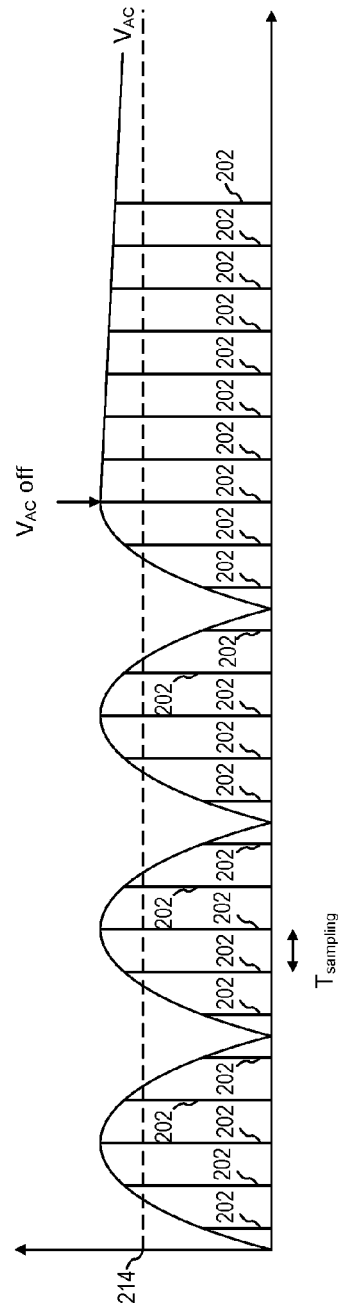

US 9,837,917 B1

X-CAP. DISCHARGE METHOD FOR FLYBACK CONVERTER

TECHNICAL FIELD

The present invention relates generally to an electronic device, and, particularly to a system and method for operating a power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switch-mode power supply (SMPS). An SMPS is usually more efficient than other types of power conversion systems because power conversion is performed by controlled charging and discharging of the inductor or transformer and reduces energy lost due to power dissipation caused by resistive voltage drops.

Specific topologies for SMPS comprise buck-boost converters and flyback converters, among others. A buck-boost converter typically makes use of an inductor whereas a flyback converter isolates a load and may multiply the voltage conversion ratio through the use of a transformer.

SUMMARY

In accordance with an embodiment, a method of operating a switch-mode power supply includes: receiving a dropout detection signal from a dropout detection circuit coupled to an input of the switch-mode power supply; and discharging an input capacitor coupled to the input of the switch-mode power supply via a switching transistor having a first load path coupled to the input capacitor through an inductive element.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2b and 2c illustrate rectified versions of AC input voltage $V_{AC}$ observed from, for example, node 226 of FIG. 2a;

FIG. 2d shows typical AC input voltage waveform 228 of a system that does not use discharge resistor $R_d$, such as the system shown in FIG. 2a;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for operating a flyback converter. Embodiments of the present invention may also be applied to various power supply and converter topologies as well as to discrete devices and other circuits, such as protection circuits.

In embodiments of the present invention, a power supply controller circuit is configured to discharge an input capacitance through a switching transistor after AC power has been disconnected from the power supply. AC power disconnection may be detected by monitoring and comparing amplitudes of successive peak voltages of AC input lines of the power supply. Some embodiments of the present invention utilize a start-up circuit and method that initially powers-up the power-supply controller circuit through the switching transistor.

Figure 1:
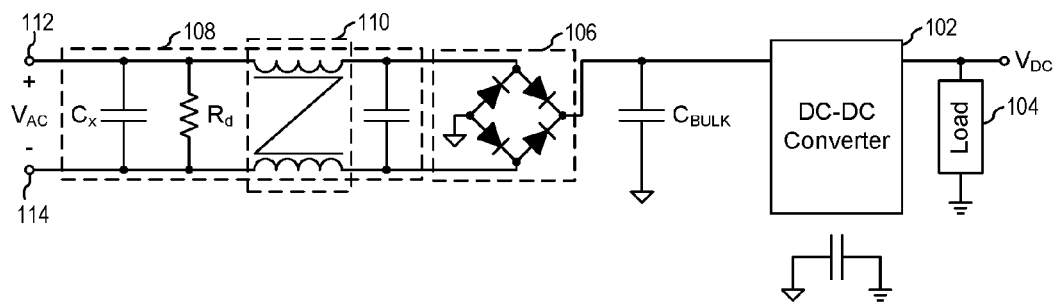
FIG. 1 illustrates a conventional power supply including front-end circuit 108, bridge rectifier 106, converter 102 and load 104.

FIG. 1 illustrates a conventional power supply including front-end circuit 108, bridge rectifier 106, converter 102 and load 104. AC power is provided across AC line inputs 112 and 114, generating AC input voltage $V_{AC}$. AC input voltage $V_{AC}$ is typically a 50 Hz, 230 V, or 60 Hz, 110 V, sinusoidal waveform. Front-end circuit 108 typically includes common mode choke 110 and capacitor $C_x$ across AC line inputs for EMI suppression and filtering.

Systems implementing capacitor $C_x$, also known as an x-capacitor or x-cap, may follow safety guidelines such as provided by IEC61010-1, which requires capacitor $C_x$ to discharge to a safe voltage within a given time after AC power has been removed. Adding discharge resistor $R_d$ across capacitor $C_x$ has been the conventional approach to safely discharge capacitor $C_x$. The value of discharge resistor $R_d$ may be in the order of 1 MΩ, and is selected to safely discharge capacitor $C_x$ within a predetermined time. Discharge resistor $R_d$, however, also provides a discharge path for AC line inputs 112 and 114 during normal operation, which may cause power consumption, including standby power consumption, to increase.

Reducing standby power consumption has been typically desirable. Standards, such as, EPS 2014 and CoC $V_5$, establish guidelines for standby power consumptions for no-load operations. Low standby power consumption may be hard to meet by systems implementing a continuous discharge path across AC line inputs 112 and 114, such as by using discharge resistor $R_d$. Various approaches have been implemented to safely discharge capacitor $C_x$ while maintain a low standby power consumption, which may include replacing discharge resistor $R_d$ with an active circuit that provides a discharge path across capacitor $C_x$ only after AC power has been disconnected. Such implementations typically use high voltage devices, such as 500 V FETs, to provide a discharge path across capacitor $C_x$.

Figure 2A:
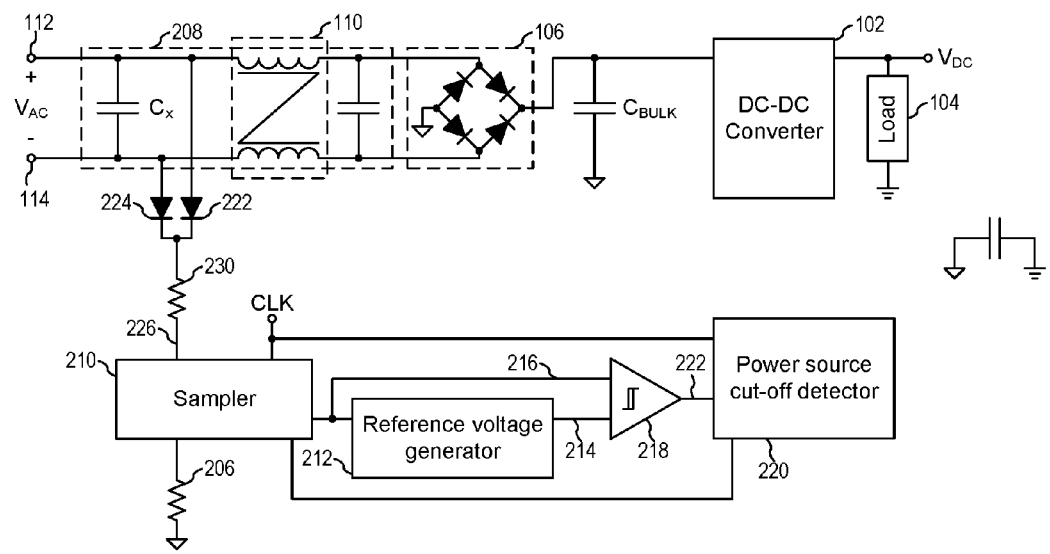
FIG. 2a shows an exemplary power supply that does not implement discharge resistor $R_d$.

FIG. 2a shows an exemplary power supply that does not use discharge resistor $R_d$. In such a system, AC input voltage $V_{AC}$ is typically sampled periodically to determine whether AC power has been disconnected through resistor 230 and diodes 222 and 224. Upon detection that AC power has been disconnected, capacitor $C_x$ is discharged to a safe level through resistor 230 and diodes 222 and 224. The resistance of resistor 230, therefore, is of a relatively low resistance value, such as 50 kΩ, to allow for sufficient current to pass through it to quickly discharge capacitor $C_x$. FIGS. 2b and 2c illustrate rectified versions of AC input voltage $V_{AC}$ observed from, for example, node 226 of FIG. 2a. FIG. 2b shows a typical AC power disconnection event. An AC power disconnection event may be detected by taking samples 202 of AC input voltage $V_{AC}$ every $T_{sampling}$ time and, when AC input voltage $V_{AC}$ is lower than predetermined threshold 214 for a number of samples, AC input power disconnection is detected. FIG. 2c shows another typical AC power disconnection event. In this case, it takes longer to reliably detect a disconnection event if power is disconnected when AC input voltage $V_{AC}$ was above predetermined threshold 214. It may take 8 AC cycles, or over 160 ms, to reliably detect all AC disconnection events.

Figure 2D:
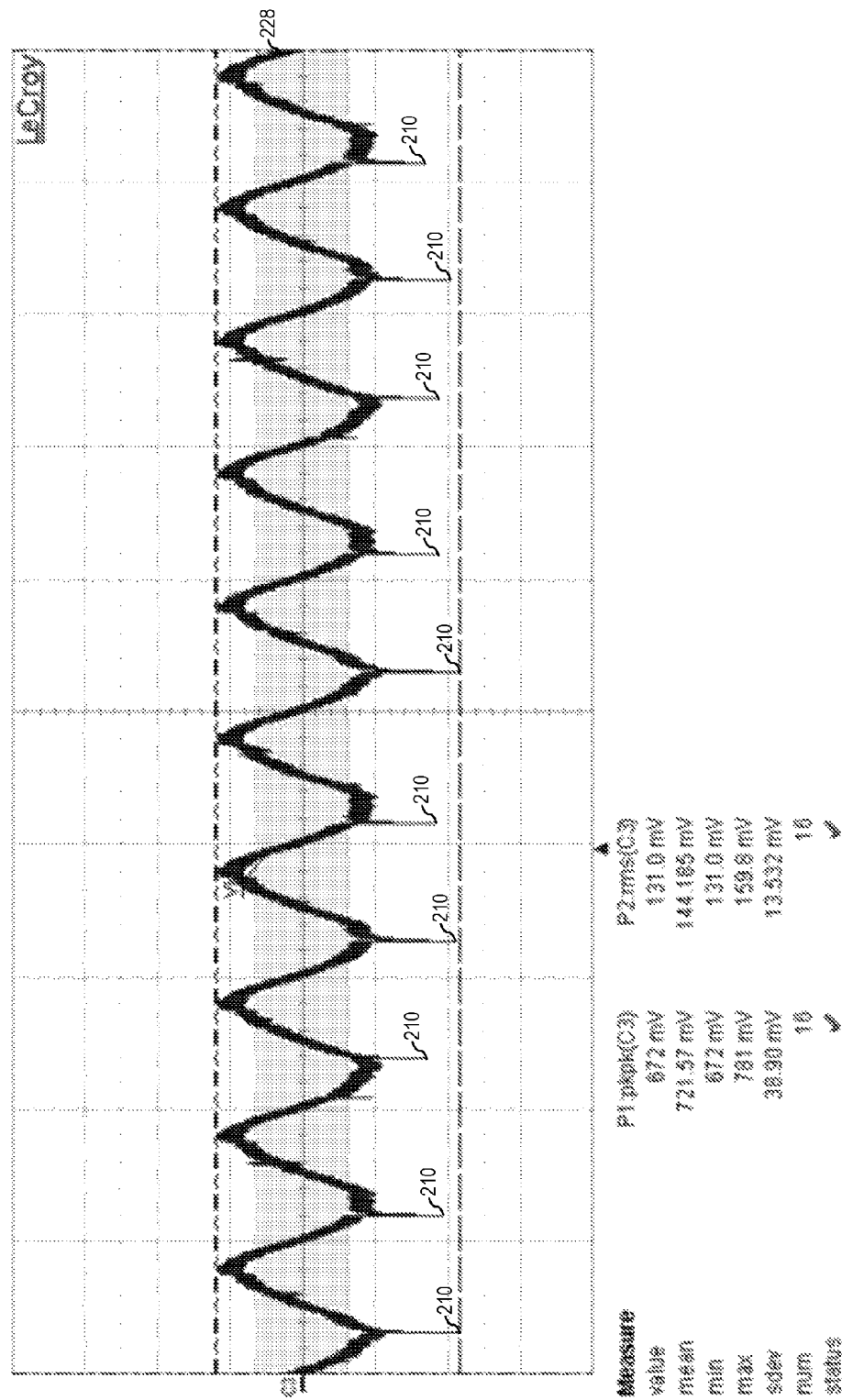

Some implementations of power supplies with active x-cap discharge circuits, such as the exemplary power supply of FIG. 2a, may exhibit current spikes as a side effect of sampling AC input voltage $V_{AC}$. FIG. 2d shows typical AC input voltage waveform 228 of such a system, which was measured between one of AC line inputs 112 and 114, and secondary side ground. Current spikes 210 occur every time AC input voltage $V_{AC}$ is sampled, and are visible as a drop in AC input voltage $V_{AC}$, with a bigger drop corresponding to a bigger current spike. Such spikes, also known as pulse current or touch current, may be undesirable. Standards such as IEC60665, IEC60950, and IEC60335-1 provide guidelines for what constitutes an acceptable touch current. In such a system, sampling frequency may be low to avoid excessive current spikes events, and may be limited, for example, to 10 samples per AC cycle, as shown in FIGS. 2b and 2C.

In an embodiment of the present invention, dropout detection block 336 detects a dropout at AC input voltage $V_{AC}$ and discharges capacitor $C_{BULK}$ and capacitor $C_x$ through switching transistor 302 and transistor 366 with a controlled current. Capacitor $C_{BULK}$ is discharged first, and then capacitor $C_x$ is automatically discharged. By discharging capacitor $C_x$ through switching transistor 302, it is not necessary to have a discharge resistor coupled between input terminals of the power supply, which provides lower power consumption during standby.

In an embodiment, monitoring of AC input voltage $V_{AC}$ is performed through resistor 330. Since capacitor $C_x$ is discharged through switching transistor 302, resistor 330 may have a high resistance value, and is typically above 20 mΩ. Having resistor 330 of high value is beneficial since it reduces touch current spikes, and allows for periodic or continuous monitoring. Periodic monitoring of AC input voltage $V_{AC}$ allows for dropout detection block 336 to capture peak voltage values of AC input voltage $V_{AC}$ to detect that AC power has been disconnected within 2 cycles of AC input voltage $V_{AC}$. An additional benefit of having resistor 330 of high value is that not enough current will flow through it and, thereby, resistor 330 will not have a significant effect in voltage $V_{GD}$. By ensuring that voltage $V_{GD}$ does not go higher than a predetermined value, such as 10 V, integrated circuit (IC) 340 may be implemented in some embodiments without using high voltage devices, such as 500 V FETs. FIG. 3a-3h illustrates SMPS 300 according to an embodiment of the present invention. SMPS 300 is configured to quickly detect when AC power has been disconnected while minimizing or eliminating touch current. After SMPS 300 detects that AC power has been disconnected, SMPS 300 safely discharges capacitor $C_x$ through switching transistor 302 and transistor 366. SMPS 300 may maintain low standby power consumption and may avoid using high voltage devices inside IC 340.

Figure 3A:
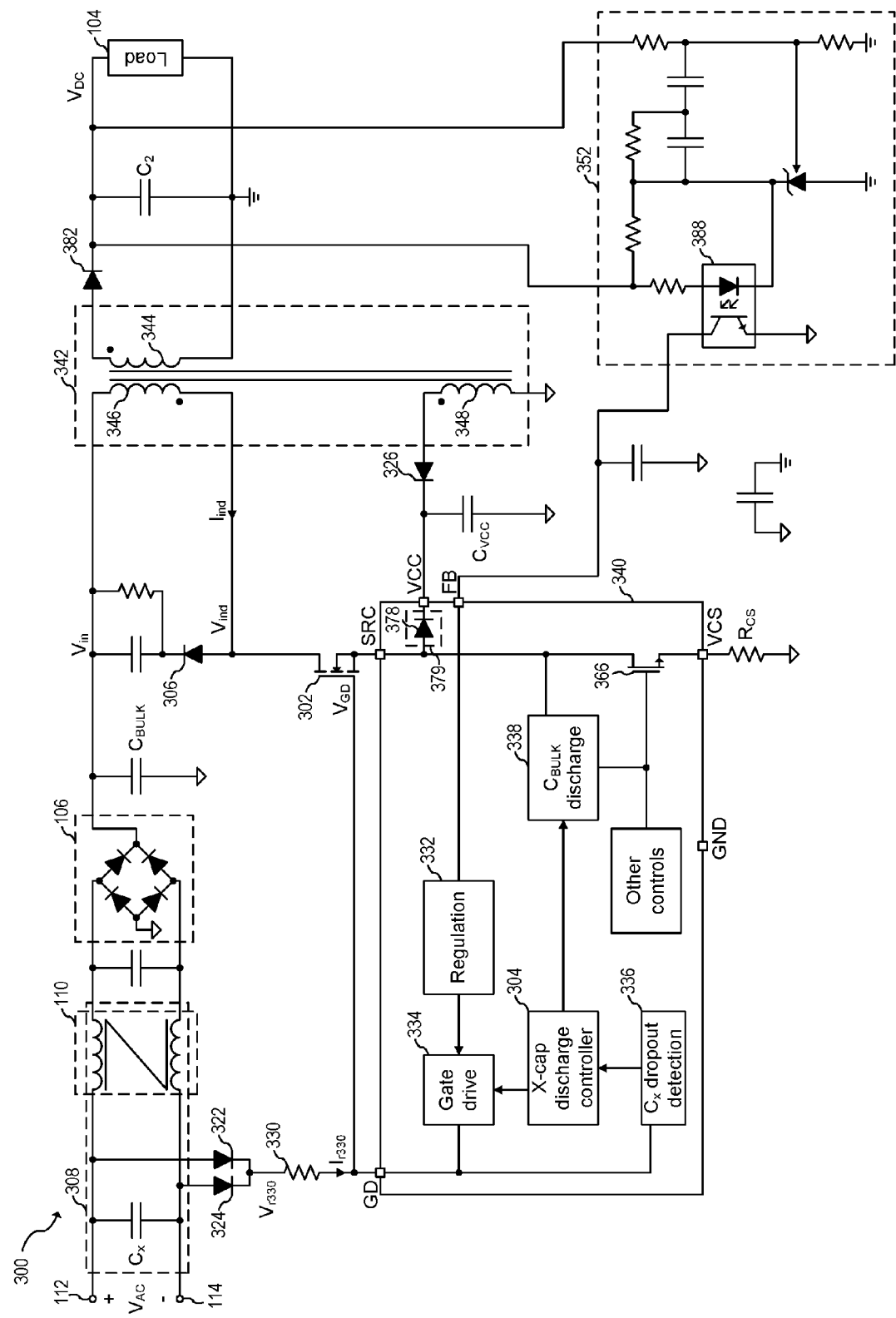
FIG. 3a shows a high level circuit schematic of SMPS 300.

FIG. 3a shows a high level circuit schematic of SMPS 300. SMPS 300 is of the flyback topology with a cascode structure, and includes front-end circuit 308, bridge rectifier 106, transformer 342, load 104, feedback circuit 352, IC 340, and switching transistor 302. IC 340 includes gate drive circuit 334, transistor 366, regulation block 332, x-cap discharge controller 304, capacitor discharge block 338, and dropout detection circuit 336.

A high level description of the general operation of SMPS 300 is as follows. During normal operation, SMPS 300 receives AC power from AC input voltage $V_{AC}$, and produces voltage $V_{DC}$. Dropout detection block 336 monitors AC input voltage $V_{AC}$ and detects when AC power has been disconnected. After dropout detection block 336 detects a dropout of AC input voltage $V_{AC}$, capacitor Cx is discharged through switching transistor 302 and transistor 366. IC 340 is configured to receive power from switching transistor 302 during start-up, and to receive power from transformer 342 during normal operation.

Front-end circuit 308 includes common mode choke no and capacitor $C_x$ across AC line inputs 112 and 114 for EMI suppression and filtering. Capacitor $C_x$ may include a single capacitor or a plurality of capacitors connected across AC line inputs 112 and 114. Some embodiments may include different EMI suppression and filtering circuits. Other embodiments may not include EMI suppression circuits or filtering circuits.

Bridge rectifier 106 is used to rectify AC input voltage $V_{AC}$. Some embodiments may implement a different rectification circuit.

Transformer 342 may perform voltage scaling between windings and may electrically isolate circuit components. For example, components connected to primary winding 346 may be electrically isolated to components connected to secondary winding 344. Transformer 342 includes primary winding 346, secondary winding 344, and auxiliary winding 348. Auxiliary winding may be used to provide power to IC 340. Alternatively, transformer 342 may not include auxiliary winding 348 and power to IC 340 may be provided in other ways known in the art. Some embodiments may not use transformer 342 and, instead, may use an inductor instead of the primary winding of a transformer in order to, for example, implement other SMPS topologies, such as a buck topology.

Feedback circuit 352 is used to sense voltage $V_{DC}$ and provide feedback to IC 340 for voltage regulation purposes. Feedback circuit 352 may be implemented in any way known in the art, for example, using a voltage divider coupled to voltage $V_{DC}$ for voltage sensing and voltage scaling, and opto-coupler 388 coupled to the voltage divider on the transmitter side, and to IC 340 on the receiver side, to deliver a signal to IC 340 based on voltage $V_{DC}$ while keeping voltage $V_{DC}$ electrically isolated from IC 340.

Switching transistor 302 may be a normally-off, n-type transistor. In embodiments of the present invention, switching transistor 302 may be implemented using transistors of the n-type or p-type including, but not limited to, metal oxide semiconductor field effect transistors (MOSFETs), power MOSFETs, junction field effect transistor (JFETs) high electron mobility transistor (HEMT) such as gallium nitride (GaN) HEMTs and insulated gate bipolar transistors (IGBTs). Alternatively, other transistor types may be used. The selection of which transistor to use may be made according to the specifications and voltage levels of the particular power converter being designed and appropriate adjustments to the circuit may be made to accommodate the particular device type. Transistor 302 may be inside IC 340 or, alternatively, may be a component external to IC 340.

IC 340 may receive power from terminal VCC, and includes gate drive circuit 334, transistor 366, regulation block 332, x-cap discharge controller 304 and dropout detection circuit 336. In other embodiments, a different set of components may be integrated inside IC 340. Similarly, any of the components may be implemented external to IC 340. A fully discrete implementation is also possible.

Transistor 366 may be a normally-off, n-type transistor, and may be a low voltage transistor. In embodiments of the present invention, transistor 366 may be implemented using transistors of the n-type or p-type including, but not limited to, metal oxide semiconductor field effect transistors (MOSFETs), power MOSFETs, junction field effect transistor (JFETs) high electron mobility transistor (HEMT) such as gallium nitride (GaN) HEMTs and insulated gate bipolar transistors (IGBTs). Alternatively, other transistor types may be used. The selection of which transistor to use may be made according to the specifications and voltage levels of the particular power converter being designed and appropriate adjustments to the circuit may be made to accommodate the particular device type. Transistor 366 may be inside IC 340 or, alternatively, may be a component external to IC 340.

Regulation block 332 regulates voltage $V_{DC}$ and it may be configured to receive a signal from feedback circuit 352, and control gate drive circuit 334 such that voltage regulation is accomplished. Regulation block 332 may be integrated inside IC 340 or, alternatively, may be a component external to IC 340.

Gate drive circuit 334 is coupled to a gate terminal of transistor 302 and is capable of applying voltage $V_{GD}$ to turn transistor 302 on or off depending on voltage $V_{GD}$ value. Voltage $V_{GD}$ may switch on and off, for example, at a frequency of 100 kHz. Other frequencies may also be used. Voltage $V_{GD}$ is typically kept between predetermined values, such as 0 V and 10 V. Gate drive circuit 334, therefore, may ensure that voltage $V_{GD}$ does not swing outside predetermined values. By ensuring that voltage $V_{GD}$ does not go higher than a predetermined value, such as 10 V, the use of high voltage devices, such as 500 V FETs, can be avoided. Gate drive circuit 334 may be integrated inside IC 340 or, alternatively, may be a component external to IC 340.

Dropout detection circuit 336 is configured to monitor AC input voltage $V_{AC}$ and detect when a dropout occurs in AC input voltage $V_{AC}$. Dropout detection circuit 336 may periodically monitor AC input voltage $V_{AC}$ via diodes 322 and 324, and resistor 330. For example, current $I_{r330}$ is given by $$I_{r330} = \frac{V_{r330} - V_{GD}}{R_{330}} \quad (1)$$

where $R_{330}$ is resistor 330 and voltage $V_{r330}$ is based on voltage $V_{AC}$ minus a diode drop. Since voltage $V_{GD}$ and resistor 330 are known, AC input voltage $V_{AC}$ may be determined by measuring current $I_{r330}$. Resistor 330 is typically in the order 20 MΩ to 100 MΩ, which may reduce power consumption and touch current. Other values of resistor 330 may be used. Dropout detection circuit 336 may be integrated inside IC 340 or, alternatively, may be a component external to IC 340.

X-cap discharge controller 304 may be capable, for example, of performing mathematical and logical operations, as well as interacting with external components. X-cap discharge controller 304 may be a general purpose controller or processor, or may be custom designed. X-cap discharge controller may be implemented with digital logic, analog circuits, a combination thereof, or any other way known in the art. X-cap discharge controller 304 may be integrated inside IC 340 or, alternatively, may be a component external to IC 340.

Capacitor discharge block 338 controls a current flowing through transistor 366. During normal operation transistor 366 may be fully on. After AC power has been disconnected, capacitor discharge block 338 may turn fully on transistor 366, or may regulate or clamp the current flowing through transistor 366 to a predetermined value.

Current regulator circuit 379 regulates a current to charge capacitor $C_{VCC}$ and it may be used during start-up to quickly turn on IC 340 by directing current from switching transistor 302 into capacitor $C_{VCC}$. Current regulator circuit 379 may be implemented by diode 378, by a current regulator circuit that may ensure a predetermined current is used to charge capacitor $C_{VCC}$, by a current clamp circuit that may ensure that capacitor $C_{VCC}$ is charged with a current not exceeding a predetermined value, or by any other method known in the art.

A description of the general operation of SMPS 300 is as follows. During normal operation, a sinusoidal waveform is applied between input terminals of SMPS 300. AC input voltage $V_{AC}$ is filtered by front-end circuit 308 and rectified by bridge rectifier 106.

IC 340 may be powered through auxiliary winding 348, which charges capacitor $C_{VCC}$ via diode 326. Some embodiments may power IC 340 with an external regulator, battery, or other methods known in the art.

Transistor 366 may be fully on during normal operation. When switching transistor 302 is on, voltage $V_{ind}$ is pulled down and primary winding current $I_{ind}$ increases according to a voltage difference given by $V_{in}$-$V_{ind}$ and primary winding 346. When switching transistor 302 is turned off, primary winding current $I_{ind}$ will suddenly drop to zero. Turning on switching transistor 302 again causes the process to repeat. The process for turning on and off switching transistor 302 may be done by PWM techniques, PFM techniques, or any other method known in the art.

As a first current flows through primary winding 346, a second current flows through secondary winding 344, which is rectified by diode 382 to generated voltage $V_{DC}$. Other rectification circuits may be used to generate voltage $V_{DC}$.

Feedback circuit 352 monitors voltage $V_{DC}$. Regulation block 332 receives a signal from feedback circuit 352 and may control gate drive circuit 334 such that voltage $V_{DC}$ is regulated to a predetermined value. Regulation block 332 may be implemented in ways known in the art.

When dropout detection circuit 336 detects that AC power has been disconnected, switching transistor 302 may be turned fully on, and capacitor discharge block 338 regulates a discharge current flowing through transistor 366 by controlling a gate of transistor 366. The discharge current may discharge capacitor $C_x$ to a safe level through bridge rectifier 106 and primary winding 346. The discharge current is typically around 100 mA, but other values may be used. A current clamp circuit may be used instead of a current regulator. Alternatively, other embodiments may turn transistor 366 fully on.

Figure 3B:
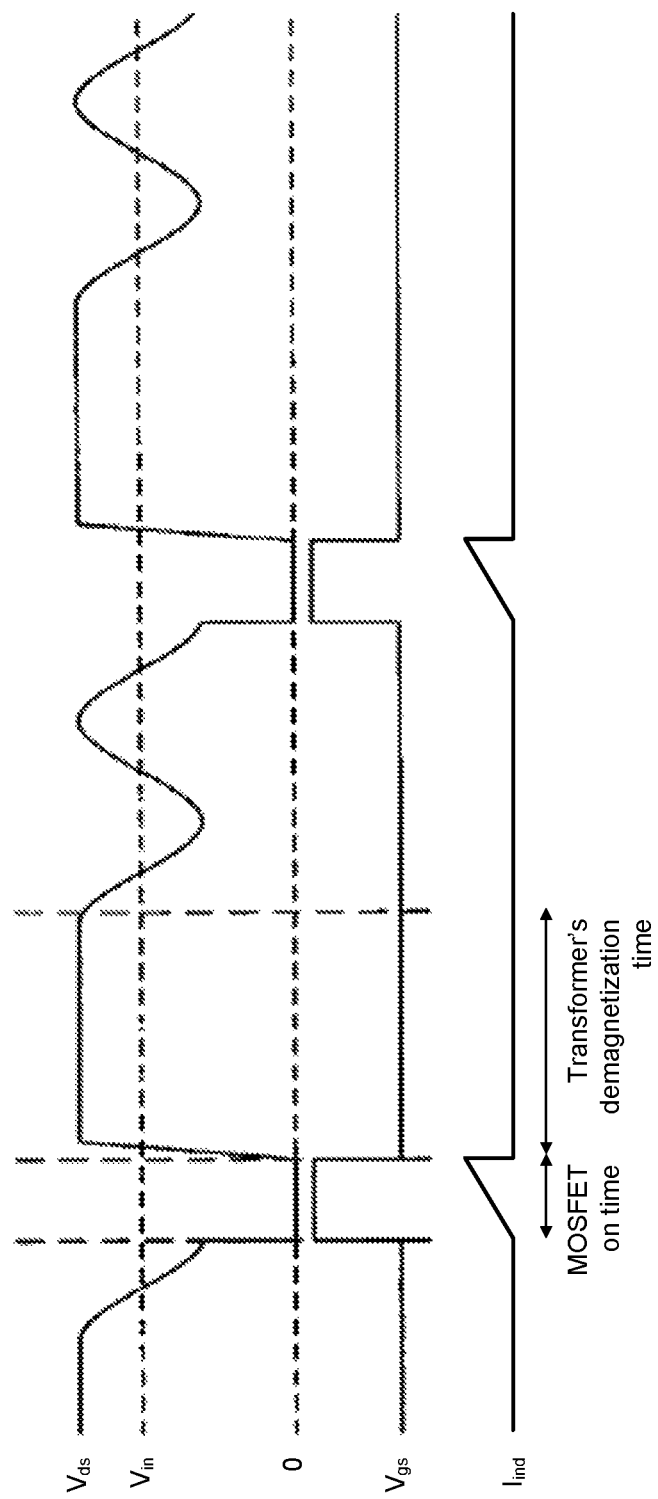
FIG. 3b illustrates voltage $V_{gs}$ across gate and source of transistor 302, voltage $V_{ds}$ across drain and source of transistor 302, and primary winding current $I_{ind}$ during switching cycles of transistor 302.

FIG. 3b illustrates voltage $V_{gs}$ across gate and source of switching transistor 302, voltage $V_{ds}$ across drain and source of switching transistor 302, and primary winding current $I_{ind}$ during switching cycles of switching transistor 302. As can be seen from FIG. 3b, when voltage $V_{gs}$ turns high, switching transistor 302 turns on, primary winding current $I_{ind}$ steadily increases, and voltage $V_{ds}$ drops near 0 V. Once voltage $V_{gs}$ turns low, primary winding current $I_{ind}$ drops to zero, and voltage $V_{ds}$ starts increasing as switching transistor 302 turns off before transformer's demagnetization time.

Figure 3C:
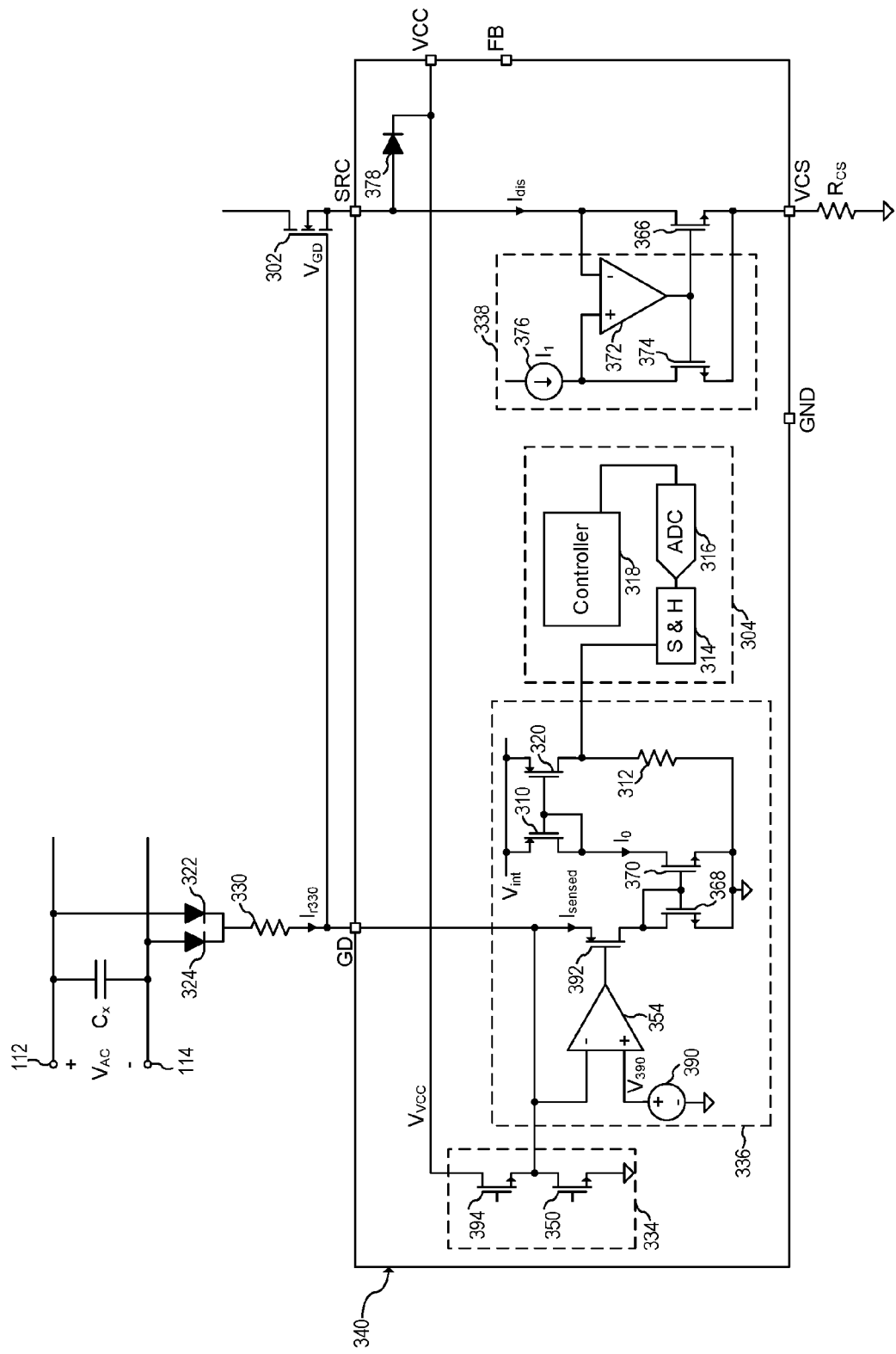
FIG. 3c shows a simplified schematic of IC 340 that shows details of gate driver 334, dropout detection circuit 336 and discharge circuit 338.

FIG. 3c shows a simplified schematic of IC 340 that shows details of gate driver 334, dropout detection circuit 336 and discharge circuit 338. As shown in FIG. 3c, gate drive circuit 334 may be implemented with transistor 394 and 350. During normal operation, transistor 394 pulls gate drive pin GD to power supply voltage $V_{VCC}$ to turn-on transistor 302, and transistor 350 pulls gate drive pin GD to ground. In various embodiments, transistors 394 and 350 may be activated by a PWM or PFM signal provided by regulation block 332 (FIG. 3a). Power for gate drive circuit 334 may be provided by a power supply coupled to terminal VCC. Alternatively, gate drive circuit 334 may receive power from a different internal rail, or from any other method known in the art. Gate drive circuit 334 may be implemented by other methods known in the art.

Dropout detection circuit 336 monitors and measures a current received from AC line inputs 112 and 114 through diodes 322 and 324 and resistor 330. The current may be measured directly or may be mirrored into current $I_o$. As shown by FIG. 3c, dropout detection circuit 336 may be implemented, with amplifier 354, reference voltage 390, transistor 392, transistor 368 and transistor 370. Transistor 368 and 370 may be configured to copy current $I_{sensed}$ flowing through transistor 392 into current $I_o$, which may be a scaled version of current $I_{sensed}$. Current $I_o$ may be measured, converted to voltage, or processed in any way known in the art to determine AC input voltage $V_{AC}$. For example, transistors 310 and 320, and resistor 312 may be implemented to make a current-to-voltage conversion (I-V conversion) of current $I_o$, and x-cap discharge controller 304 may process the resulting voltage, for example, by using sample-and-hold (S&H) circuit 314, analog-to-digital (ADC) 316 and controller 318.

To ensure that current $I_{sensed}$ is substantially similar to current $I_{r330}$, transistors 394 and 350 are turned off during current $I_{sensed}$ measuring time. During this time, gate voltage $V_{GD}$ is provided by amplifier 354 and transistor 392, which apply voltage $V_{390}$ to pin GD. Voltage $V_{390}$ may be a fixed voltage, such as 2 V, but other voltages may be used. Some embodiments may use variable voltages for voltage $V_{390}$.

Current $I_{r330}$ may be sampled when switching transistor 302 is on, and during transformer's demagnetization time when switching transistor 302 is off. In embodiments where the switching frequency of transistor 302 is substantially higher than the frequency of AC input voltage $V_{AC}$, dropout detection circuit 336 may accurately detect and store peak voltage, zero-crossings, and frequency of AC input voltage $V_{AC}$. A pre-processing step, including filtering, may also be possible, which may improve reliability by, for example, filtering out sampling glitches. Dropout detection circuit 336 may also stream stored and measured values to other internal or external blocks, including, but not limited to, x-cap discharge controller 304. Some embodiments may use a different implementation of dropout detection circuit 336.

Capacitor discharge block 338 biases transistor 366 to control discharge current $I_{dis}$. When capacitor discharge block 338 is activated, transistor 366 is biased to sink a controlled current $I_{dis}$. As shown, transistor 366 is the output transistor of an active current mirror implemented using transistors 366, 374 and amplifier 372. Current $I_1$, generated by reference current generator 376, may be copied and scaled into discharge current $I_{dis}$ by, for example, modifying the sizing ratio of transistor 374 and transistor 366 to obtain discharge current $I_{dis}$ of a desired value, such as 100 mA. Other current regulation circuits and techniques may be used. Some embodiments may instead use a current clamp circuit. Other embodiments may instead turn transistor 366 fully on.

Figure 3D:
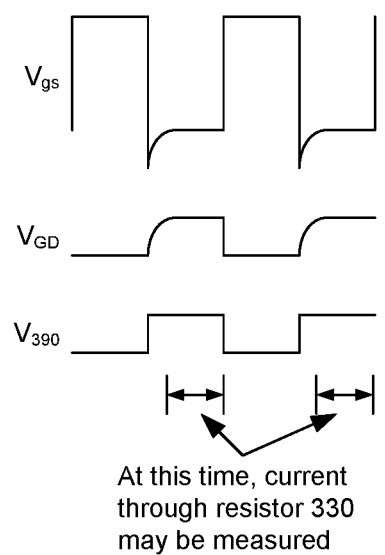
FIG. 3d illustrates voltage $V_{gs}$ across gate and source of switching transistor 302, voltage $V_{GD}$ at the gate of switching transistor 302 and voltage $V_{390}$ at the input of amplifier 354 of an embodiment of the present invention according to FIG. 3c.

FIG. 3d illustrates voltage $V_{gs}$ across gate and source of switching transistor 302, voltage $V_{GD}$ at the gate of switching transistor 302 and voltage $V_{390}$ at the input of amplifier 354 of an embodiment of the present invention according to FIG. 3c. As can be seen from FIG. 3d, current $I_{r330}$ may be sampled when voltage $V_{390}$ is high. Since switching transistor 302 switches at a relatively high frequency, such as 100 kHz, application of voltage $V_{390}$ to the gate of switching transistor 302 as shown in FIG. 3d should not substantially affect primary winding current $I_{ind}$ flowing through primary winding 346.

Figure 3E:
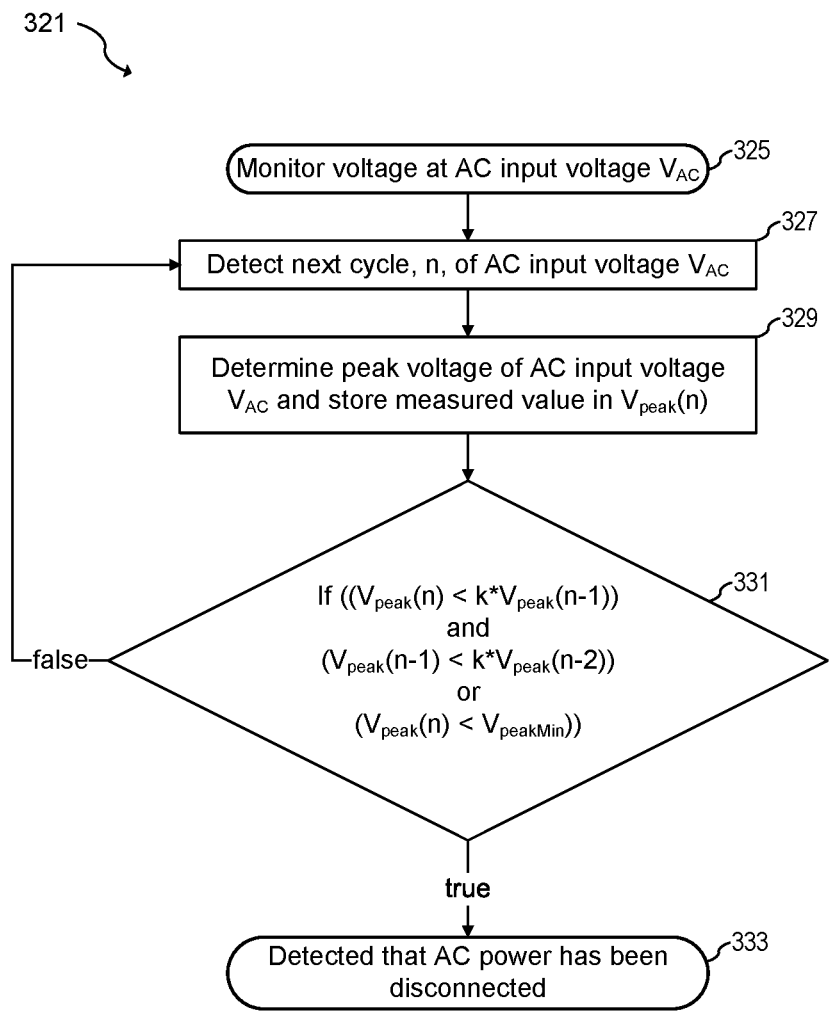
FIGS. 3e and 3f illustrate flow charts of embodiment method 321 and 335 for detecting when AC power has been disconnected.

FIG. 3e illustrates a flow chart of embodiment method 321 for detecting when AC power has been disconnected. Method 321 monitors AC input voltage $V_{AC}$ and determines that AC power has been disconnected when it detects a dropout in AC input voltage $V_{AC}$. Specifically, Method 321 monitors peak voltages of AC input voltage $V_{AC}$, and detects a dropout event when three consecutive peaks have monotonically decreased. Method 321 may be implemented in SMPS 300, for example, by x-cap discharge controller 304, but it may also be implemented in other circuit architectures and in other ways known in the art. The discussion that follows assumes that SMPS 300, as shown in FIGS. 3a and 3c, implements method 321 for detecting when AC power has been disconnected.

Step 325 monitors AC input voltage $V_{AC}$ by, for example, utilizing dropout detection circuit 336. Step 327 determines next cycle, n, of AC input voltage $V_{AC}$. Step 329 determines peak voltage at AC input voltage $V_{AC}$ by, for example, a peak detector (not shown), digital techniques such as storing value in temporary memory, or any other method known in the art. Step 331 compares peak voltages of three consecutives samples, where cycle n-2 represents a cycle earlier in time than cycle n-1, and cycle n-1 represents a cycle earlier in time that cycle n. If peak voltage of AC input voltage $V_{AC}$ declines from cycle n-2 to cycle n-1, and from cycle n-1 to cycle n, then power has been disconnected. Otherwise, method 321 waits for the next cycle of AC input voltage $V_{AC}$ and repeats the process. To address cases where AC input voltage $V_{AC}$ suddenly drops, for example, to 0 V, peak voltage at cycle n $V_{peak}(n)$ is compared with a predetermined $V_{peakMin}$ value. A power disconnection may be detected when peak voltage at cycle n $V_{peak}(n)$ is lower than $V_{peakMin}$ value. A factor k may be included, as illustrated in step 331, to improve detection reliability. Factor k may be a number between 0 and 1, and typically ranges between 0.9 and 0.98. Some embodiments may skip a cycle or more between measurements. Other embodiments may use more than three consecutive cycles to determine that power has been disconnected, or may use less than three. Embodiment method 321 has the advantage that it may detect that AC power has been disconnected within a very short time, such as within 2 AC cycles or less than 40 ms.

Figure 3F:
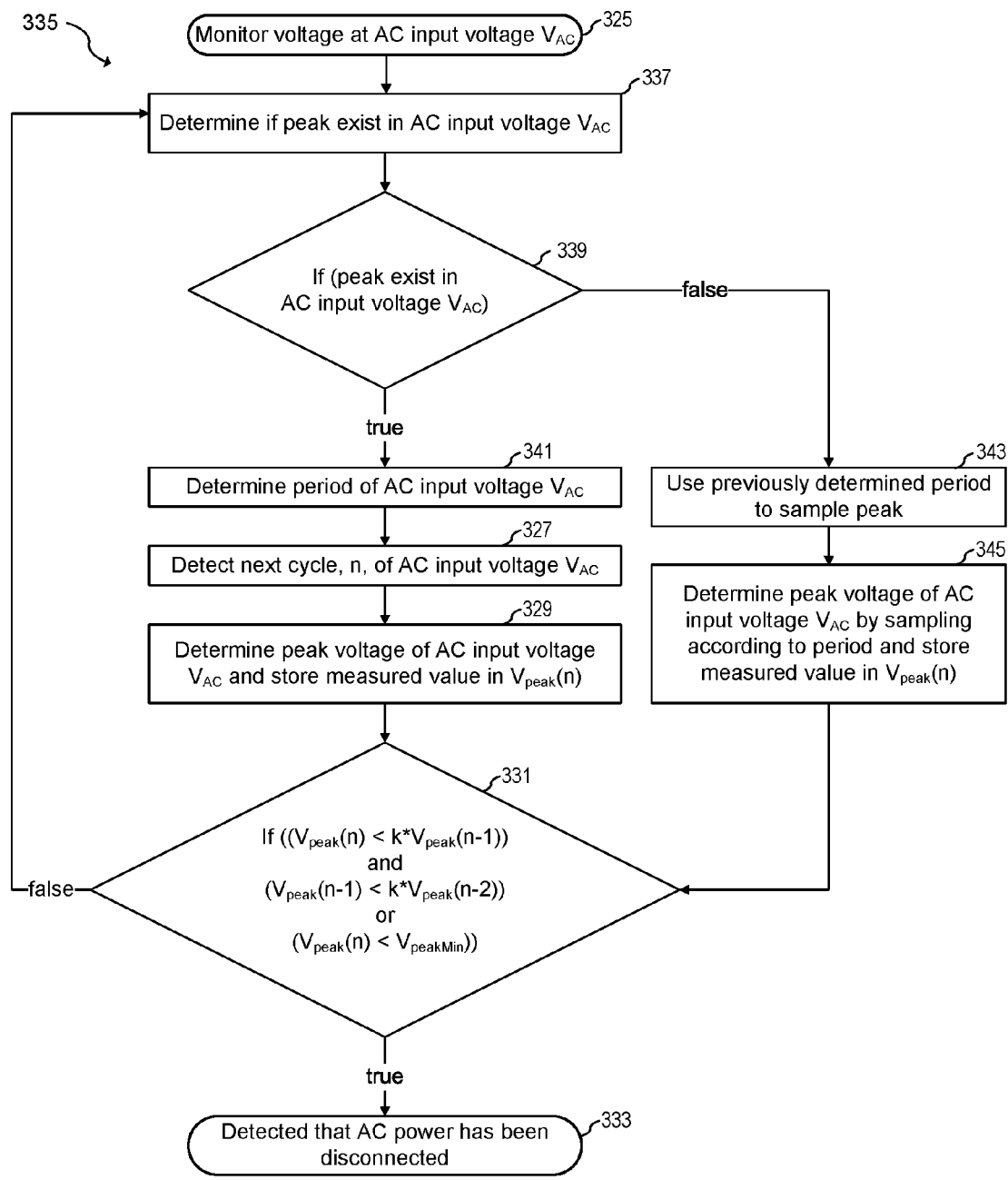

It is possible that after AC power has been disconnected, no AC cycles will be observed in AC input voltage $V_{AC}$ and, instead, AC input voltage $V_{AC}$ may be a monotonically decaying ramp. To address such scenario, FIG. 3f illustrates embodiment method 335 for detecting when AC power has been disconnected. Method 335 may be implemented in SMPS 300, for example, by x-cap discharge controller 304, but it may also be implemented in other circuit architectures and in other ways known in the art. The discussion that follows assumes that SMPS 300, as shown in FIGS. 3a and 3c, implements method 335 for detecting when AC power has been disconnected.

Step 325 monitors AC input voltage $V_{AC}$ by, for example, utilizing dropout detection circuit 336. Step 337 determines if AC input voltage $V_{AC}$ is oscillating and, thereby, exhibiting peaks and valleys. A valley represents the lowest voltage of AC input voltage $V_{AC}$ during an AC cycle. If it is determined in step 339 that AC input voltage $V_{AC}$ is still oscillating, step 341 determines the period of AC input voltage $V_{AC}$ and steps 327, 329, 331 and 333 are executed in a similar way as in method 321. Step 341 may determine the period by measuring the time between two consecutive peaks, between two consecutive valleys, between a peak and a valley, between a valley and a peak, or in any other way known in the art.

If, instead, it is determined in step 339 that no peak is observable, the previously determined period is used to sample AC input voltage $V_{AC}$ at the time where the peak was supposed to occur, and stores the value as the peak voltage in step 345. If there has been no previously determined period, a default value may be used, such as 10 ms. Steps 331 and 333 are executed in a similar way as in method 321.

Method 335 may be implemented by measuring valley voltages instead of peak voltages, and determining that AC power has been disconnected if three consecutive valleys are higher than a predetermined value. Method 335 may also be implemented by determining that three consecutive peaks are lower than a predetermined threshold. A different number of consecutive peaks or valleys may be used instead. Alternatively, method 335 may be implemented by a determined that consecutive peaks are lower than a predetermined threshold and consecutive valleys are higher than a predetermined threshold for a predetermined number of consecutive cycles.

Figure 3G:
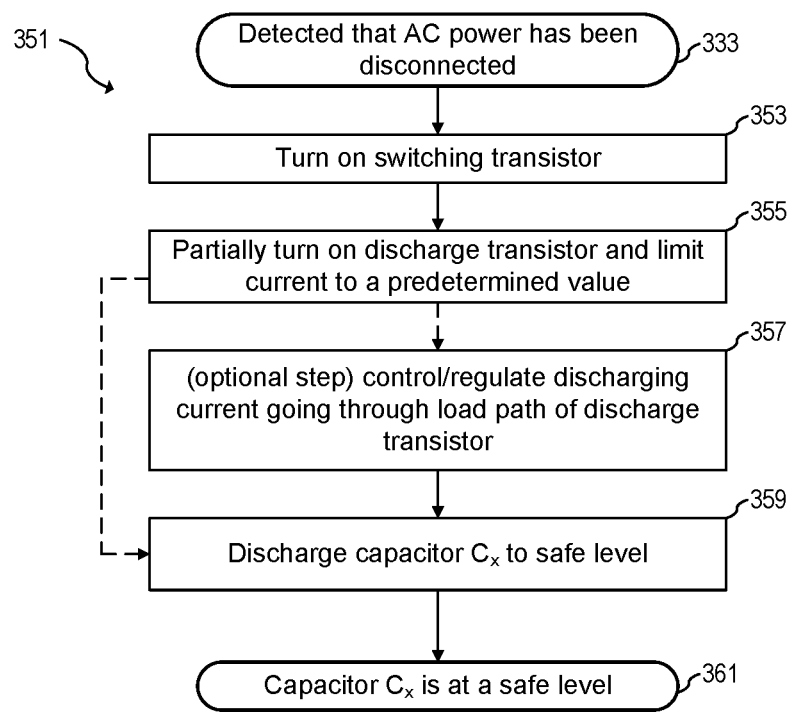
FIG. 3g illustrates a flow chart of embodiment method 351 for discharging capacitor $C_x$.

FIG. 3g illustrates a flow chart of embodiment method 351 for discharging capacitor $C_x$. Method 351 may be implemented in SMPS 300, for example, by x-cap discharge controller 304, but it may also be implemented in other circuit architectures and in other ways known in the art. The discussion that follows assumes that SMPS 300, as shown in FIGS. 3a and 3c, implements method 351 for discharging capacitor $C_x$.

Step 333 detects that AC power has been disconnected by, for example, dropout detection circuit 336. Step 353 and 355 turn on switching transistor 302 and transistor 366 to allow capacitor $C_x$ to discharge through primary winding 336. Discharging capacitor $C_x$ through primary winding also involves discharging bulk capacitor $C_{bulk}$. Bulk capacitor $C_{bulk}$ may be a 66 μF capacitor for a typical 25 W power supply, and may require a discharge time of 0.25 seconds. Step 355 turns on transistor 366, at least partially. In some embodiments, transistor 366 may be turned fully on. Alternatively, step 357 is executed, where current flowing through discharge transistor may be controlled, limited, or regulated by capacitor discharge block 338. Step 359 discharges capacitor $C_x$ to a safe level. In step 361, voltage of capacitor $C_x$ reaches a safe level.

Figure 3H:
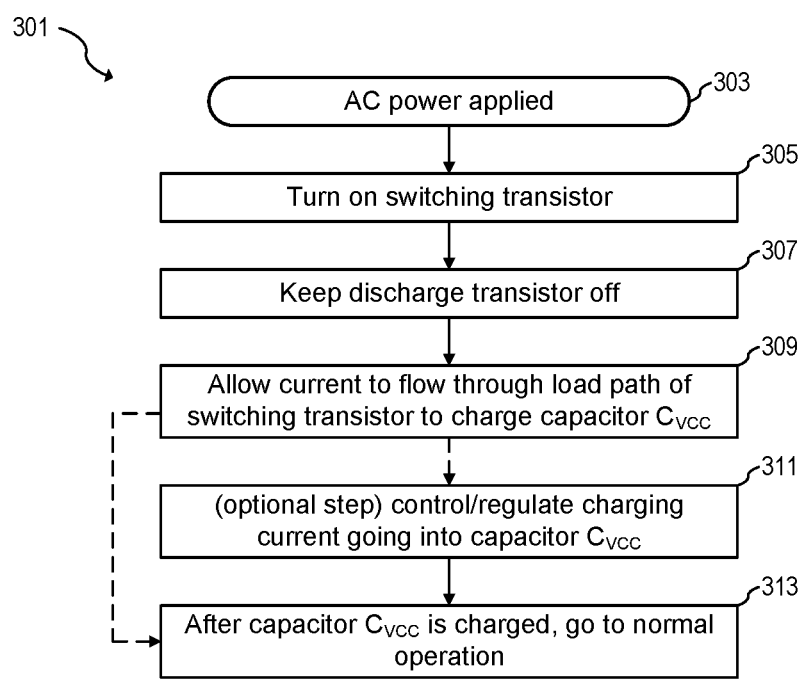
FIG. 3h illustrates a flow chart of embodiment method 301 for quickly starting up an SMPS.

FIG. 3h illustrates a flow chart of embodiment method 301 for quickly starting up an SMPS. Method 301 may be implemented in SMPS 300, for example, by x-cap discharge controller 304, but it may also be implemented in other circuit architectures and in other ways known in the art. The discussion that follows assumes that SMPS 300, as shown in FIG. 3a, implements method 301 for quickly starting up an SMPS.

In step 303, AC power is applied, which causes AC input voltage $V_{AC}$ to begin oscillating. Step 305 turns on switching transistor 302 by, for example, pulling up voltage $V_{GD}$ through diodes 322 and 324 and resistor 330. Turning on switching transistor 302 causes a current flowing through bridge rectifier 106 and primary winding 346 to charge capacitor $C_{VCC}$ via diode 378 since, at that point, transistor 366 is off. Step 307 ensures that transistor 366 remains off during start-up. Transistor 366 may be kept off by, for example, applying a turn-off voltage to its gate. Capacitor $C_{VCC}$ charging current may be a regulated current, a current limited to a predetermined value, or allowed to flow freely through, for example, diode 378. By initially charging capacitor $C_{VCC}$ via switching transistor 302, a faster start-up may be achieved than relying solely on auxiliary winding to charge capacitor $C_{VCC}$. After capacitor $C_{VCC}$ reaches a turn-on voltage, IC 340 turns on. Transistor 366 may be kept off for a period of time to ensure IC 340 is fully on. In step 313, transistor 366 is turned fully on for normal operation.

Figure 4A:
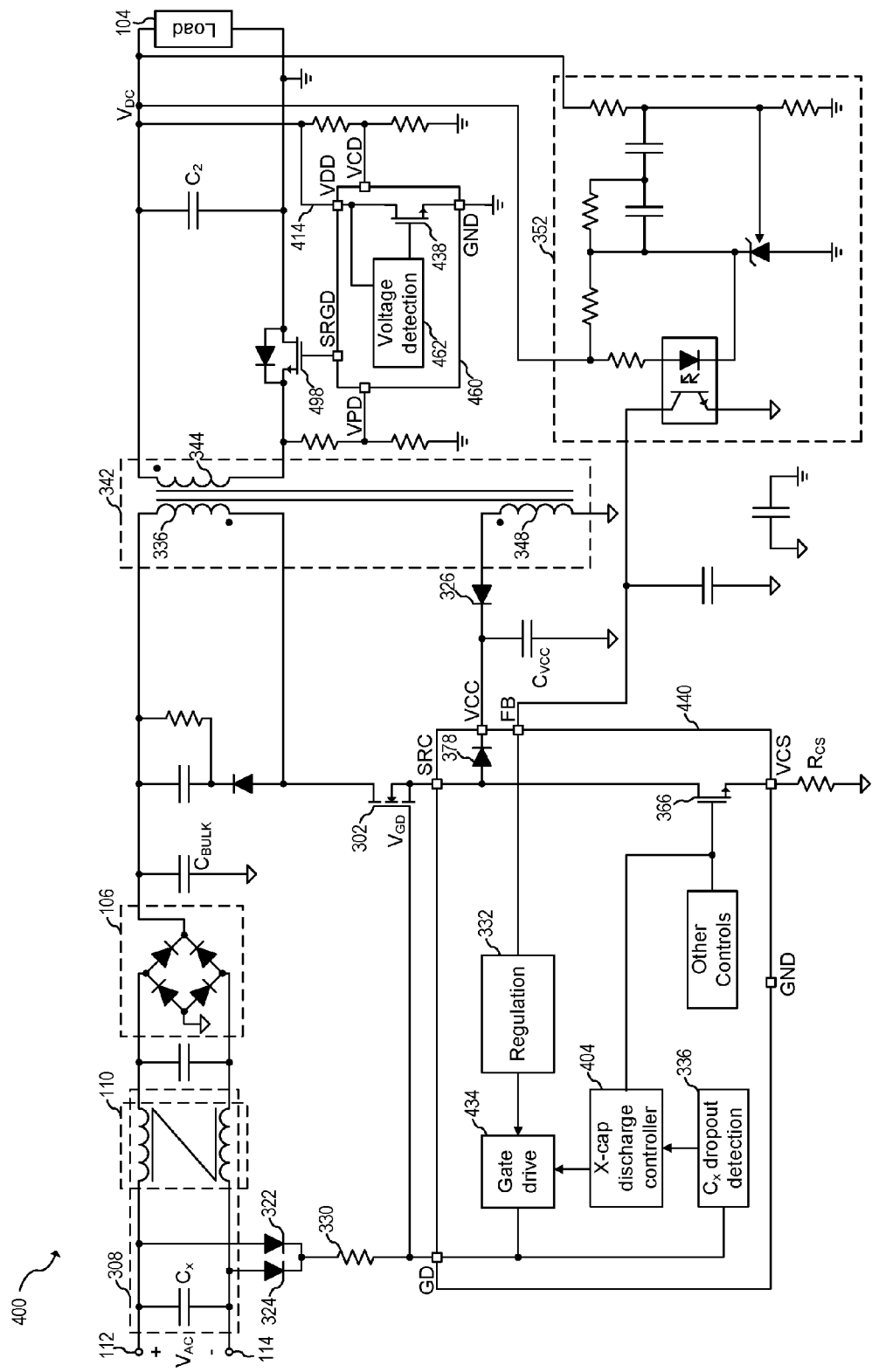
FIG. 4a shows a high level circuit schematic of SMPS 400.
Figure 4B:
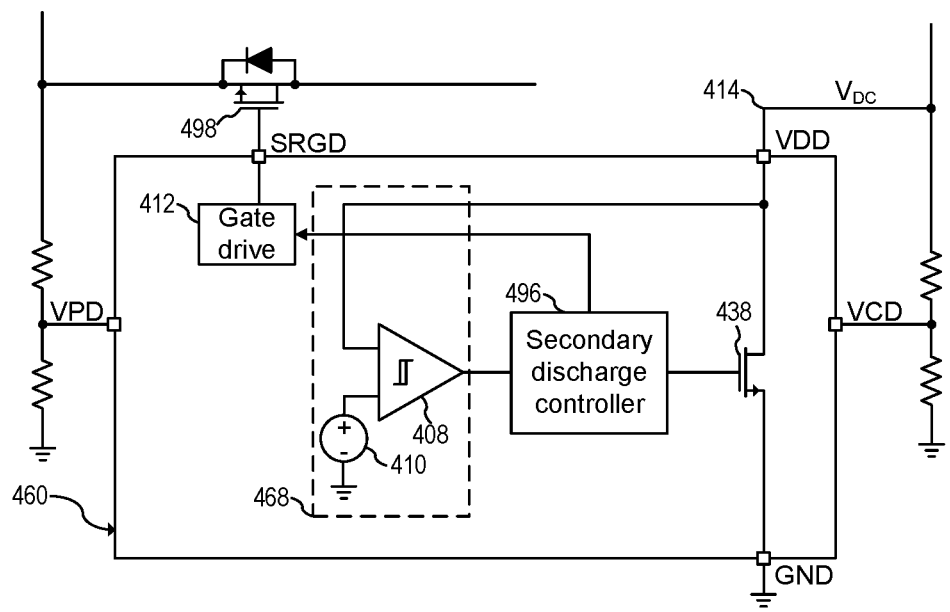
FIG. 4b shows a simplified schematic of synchronous rectifier controller IC 460.
Figure 4C:
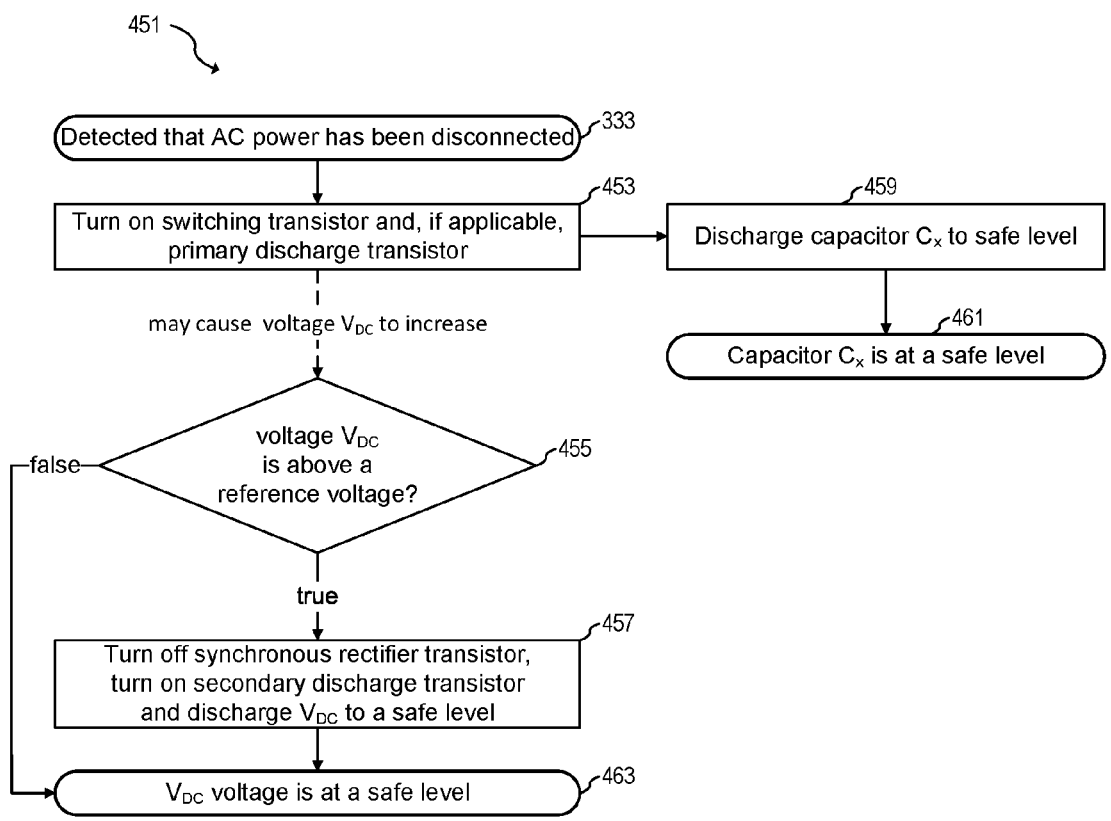
FIG. 4c illustrates a flow chart of embodiment method 451 to discharge capacitor $C_x$ after AC power disconnection has been detected.

FIGS. 4a-4c illustrates SMPS 400 according to a further embodiment of the present invention. Similar to SMPS 300, SMPS 400 is configured to quickly detect when AC power has been disconnected while minimizing or eliminating touch current. After SMPS 400 detects that AC power has been disconnected, SMPS 400 safely discharges capacitor $C_x$ through switching transistor 302 and transistor 366. SMPS 400 may maintain low standby power consumption and may avoid using high voltage devices inside IC 440.

SMPS 400 may operate in a similar manner as SMPS 300 during start-up and normal operation, and may implement method 321 and 335 for detecting when AC power has been disconnected, method 351 for discharging capacitor $C_x$, and method 301 for quickly starting up an SMPS. SMPS 400, however, uses synchronous rectifier transistor 498 instead of diode 382 and may implement synchronous rectification. Synchronous rectification is a technique known in the art for improving rectification efficiency by replacing diodes with actively controlled switches.

FIG. 4a shows a high level circuit schematic of SMPS 400. SMPS 400 is of the flyback topology with a cascode structure, and includes front-end circuit 308, bridge rectifier 106, transformer 342, load 104, synchronous rectifier transistor 498, feedback circuit 352, IC 440, switching transistor 302, and synchronous rectifier controller IC 460.

During normal operation, synchronous rectifier transistor 498 is operated in ways known in the art. When capacitor $C_x$ is discharged through primary winding 336 with a current that causes voltage $V_{DC}$ to increase above a predetermined value, synchronous rectifier controller IC 460 turns off synchronous rectifier transistor 498 and turns on secondary transistor 438, at least partially, to allow voltage $V_{DC}$ to decrease below a predetermined value.

Synchronous rectifier controller IC 460 monitors voltages across secondary winding 344 and actively controls synchronous rectifier transistor 498 to achieve proper rectification, for example, by following synchronous rectification methods known in the art. Synchronous rectifier controller IC 460 also monitors voltage $V_{DC}$ and discharges voltage $V_{DC}$ when an over-voltage event occurs at voltage $V_{DC}$. FIG. 4b shows a simplified schematic of synchronous rectifier controller IC 460. As shown in FIG. 4b, synchronous rectifier controller 460 may be implemented with gate drive 412, reference voltage generator 410, secondary transistor 438, comparator 408, and secondary discharge controller 496. In other embodiments, a different set of components may be integrated inside synchronous rectifier controller 460. Similarly, any of the components may be implemented external to synchronous rectifier controller 460. A fully discrete implementation is also possible.

When voltage $V_{DC}$ increases above a predetermined value, secondary discharge controller 496 turns off synchronous rectifier transistor 498 and turns on secondary transistor 438, at least partially. Secondary transistor 438 may be turned fully on, or, alternatively, may clamp or regulate a current flowing through a load path of secondary transistor 438. Comparator 408 may compare reference voltage 410 with voltage $V_{DC}$, or a scaled version of $V_{DC}$. Other implementations known in the art to detect an over-voltage event may be used.

FIG. 4c illustrates a flow chart of embodiment method 451 to discharge capacitor $C_x$ after AC power disconnection has been detected. Method 451 discharges capacitor $C_x$ by turning switching transistor 302 fully on. To address the potential over-voltage event that could occur at voltage $V_{DC}$ as a result of discharging capacitor $C_x$ with high current, method 451 actively monitors voltage $V_{DC}$ and discharges voltage $V_{DC}$ if voltage $V_{DC}$ goes above a predetermined value. Method 451 may be implemented in SMPS 400, for example, by x-cap discharge controller 404, but it may also be implemented in other circuit architectures and in other ways known in the art. The discussion that follows assumes that SMPS 400, as shown in FIGS. 4a and 4b, implements method 451 to discharge capacitor $C_x$ after AC power disconnection has been detected.

Step 333 detects that AC power has been disconnected by, for example, dropout detection circuit 336. Step 453 turns fully on switching transistor 302 and transistor 366 with, for example, full duty cycle switching, to allow capacitor $C_x$ to discharge through primary winding 336. Step 459 and 461 discharge capacitor $C_x$ to a safe level. Due to magnetic coupling between primary winding 336 and secondary winding 344, switched current through primary winding 336, may cause voltage $V_{DC}$ to increase. Step 455, therefore, checks whether voltage $V_{DC}$ is above a reference voltage. If voltage $V_{DC}$ is above a reference voltage, synchronous rectifier controller IC 460 turns off synchronous rectifier transistor 498 and turns on secondary transistor 438 to allow voltage $V_{DC}$ to discharge to a safe level.

Figure 5A:
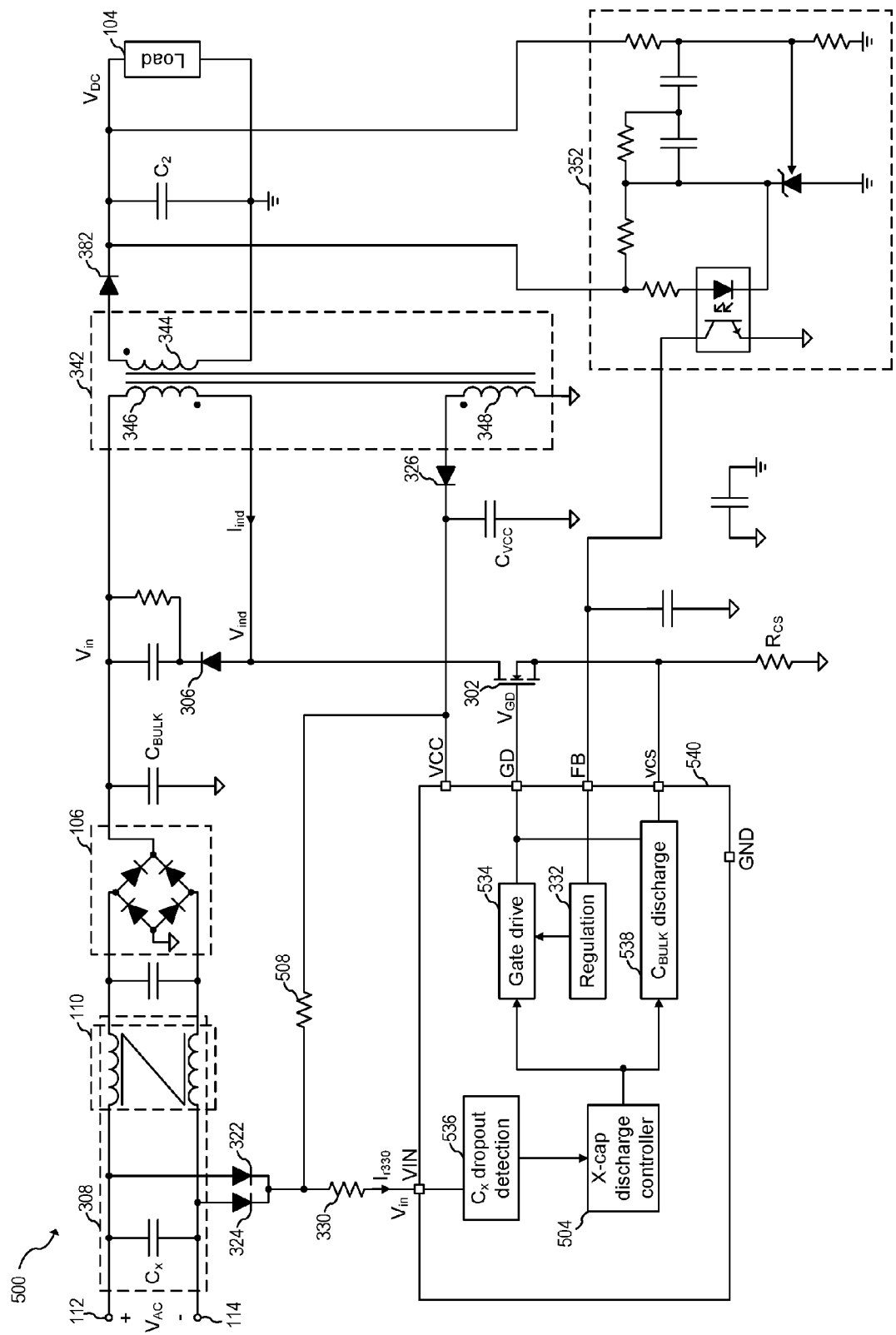
FIG. 5a shows a high level circuit schematic of SMPS 500.
Figure 5B:
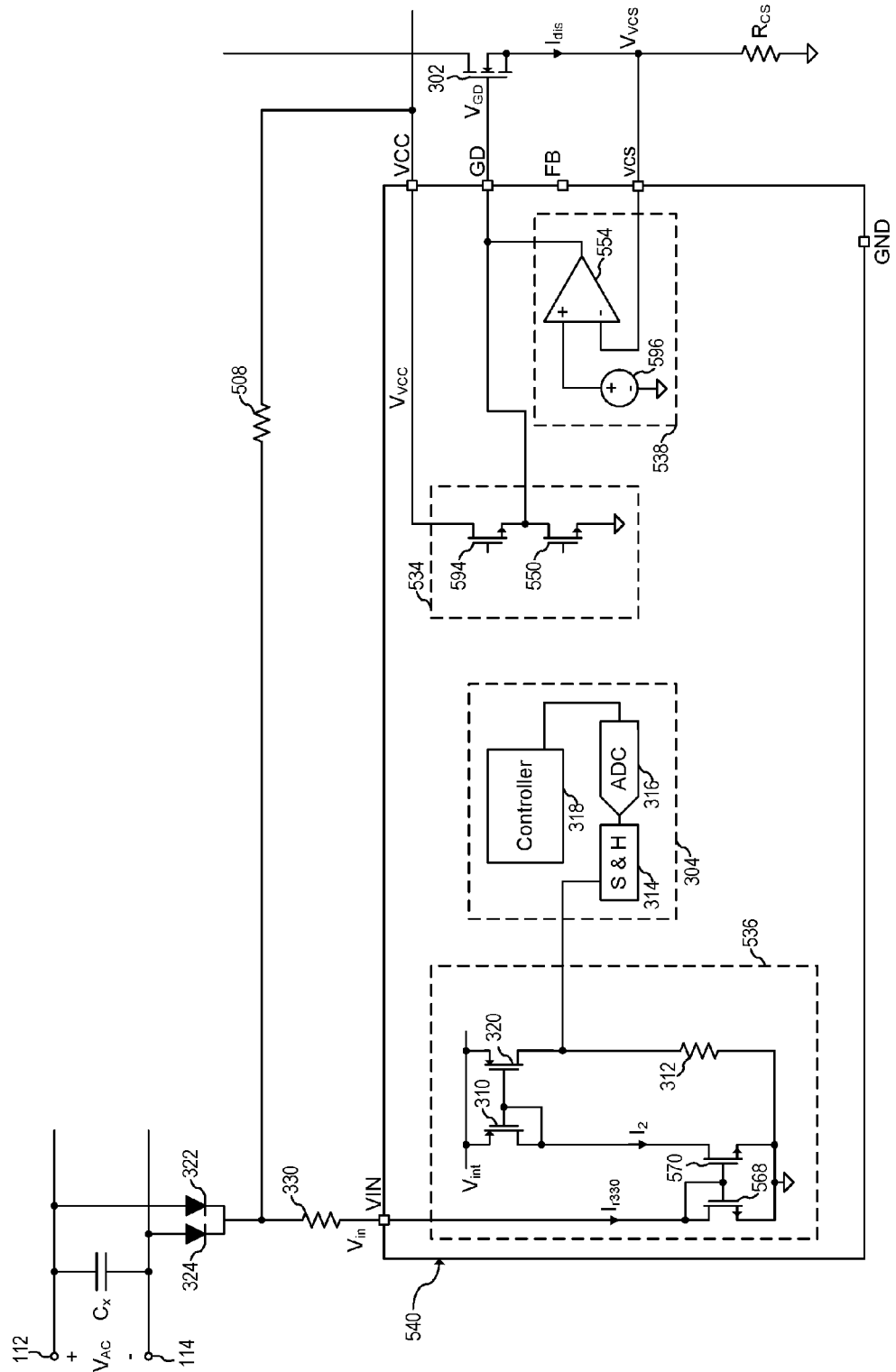
FIG. 5b shows a simplified schematic of IC 540 that shows details of gate drive circuit 534, capacitor discharge block 538, and dropout detection circuit 536.

FIGS. 5a-5b illustrates SMPS 500 according to an embodiment of the present invention. Similarly to SMPS 300, SMPS 500 is configured to quickly detect when AC power has been disconnected while minimizing or eliminating touch current. After SMPS 500 detects that AC power has been disconnected, SMPS 500 safely discharges capacitor $C_x$ through switching transistor 302. SMPS 500 may maintain low standby power consumption.

SMPS 500 may operate in a similar manner as SMPS 300 during normal operation, and may implement method 321 and 335 for detecting when AC power has been disconnected. SMPS 500, however, controls a discharge current by controlling switching transistor 302. SMPS 500, therefore, may not implement transistor 366. SMPS 500 does not have resistor 330 connected to a gate of switching transistor 302 and, therefore, may monitor current $I_{r330}$ continuously. A start-up may be achieved by coupling AC input voltage $V_{AC}$ with terminal VCC of IC 540 through diodes 322 and 324 and resistor 508.

FIG. 5a shows a high level circuit schematic of SMPS 500. SMPS 500 is of the flyback topology with a direct-drive structure, and includes front-end circuit 308, bridge rectifier 106, transformer 342, load 104, feedback circuit 352, IC 540, and switching transistor 302. IC 540 includes gate drive circuit 534, regulation block 332, x-cap discharge controller 504, capacitor discharge block 538, and dropout detection circuit 536.

SMPS 500 is configured to monitor AC input voltage $V_{AC}$, detect when AC power has been disconnected, and discharge capacitor $C_x$ through switching transistor 302 after AC power has been disconnected from the power supply.

IC 540 may be powered through auxiliary winding 348, which charges capacitor $C_{VCC}$ via diode 326. IC 540 may initially be powered through resistor 508. Some embodiments may power IC 540 with an external regulator, battery, or other methods known in the art.

When dropout detection circuit 536 detects that AC power has been disconnected, switching transistor 302 may be turned fully on, and capacitor discharge block 538 may regulate a discharge current flowing through switching transistor 302 by controlling a gate of switching transistor 302. The discharge current may discharge capacitor $C_x$ to a safe level through bridge rectifier 106 and primary winding 346. The discharge current is typically around 100 mA, but other values may be used. A current clamp circuit may be used instead of a current regulator. Alternatively, other embodiments may turn switching transistor 302 fully on.

FIG. 5b shows a simplified schematic of IC 540 that shows details of gate drive circuit 534, capacitor discharge block 538, and dropout detection circuit 536. As shown in FIG. 5b, gate drive circuit 534 may be implemented with transistor 594 and 550. During normal operation, transistor 594 pulls gate drive pin GD to power supply voltage $V_{VCC}$ to turn-on transistor 302, and transistor 550 pulls gate drive pin GD to ground. In various embodiments, transistors 594 and 550 may be activated by a PWM or PFM signal provided by regulation block 332 (FIG. 5*a*). Power for gate drive circuit 534 may be provided by a power supply coupled to terminal VCC. Alternatively, gate drive circuit 534 may receive power from a different internal rail, or from any other method known in the art. Gate drive circuit 534 may be implemented by other methods known in the art.

Dropout detection circuit 536 monitors and measures a current received from AC line inputs 112 and 114 through diodes 322 and 324 and resistor 330. The current may be measured directly or may be mirrored into current $I_2$. Dropout detection circuit 536 may be implemented with transistor 568 and transistor 570 configured to copy current $I_{r330}$ into current $I_2$, which may be measured, converted to voltage, or processed in any way known in the art to determine AC input voltage $V_{AC}$. For example, transistors 310 and 320, and resistor 312 may be implemented to make an I-V conversion of current $I_2$, and x-cap discharge controller 304 may process the resulting voltage, for example, by using S&H circuit 314, ADC 316 and controller 318.

Dropout detection circuit 536 implementation shown in FIG. 5*b* allows a system to determine AC input voltage $V_{AC}$ continuously, enabling further filtering and signal processing for even faster AC power disconnection detection and other applications, such as accurate AC input voltage $V_{AC}$ frequency and ripple monitoring.

Capacitor discharge block 538 biases switching transistor 302 to control discharge current $I_{dis}$. When capacitor discharge block 538 is activated, switching transistor 302 is biased to sink a controlled current $I_{dis}$. As shown in FIG. 5*b*, capacitor discharge block 538 may be implemented with reference voltage generator 596, amplifier 554 coupled to switching transistor 302. Amplifier 554 ensures that voltage $V_{VCS}$ tracks a voltage generated by reference voltage generator 596, controlling and regulating discharge current $I_{dis}$ to a predetermined value, such as 100 mA. Transistors 594 and 550 may be off while discharging capacitor $C_x$.

Figure 6:
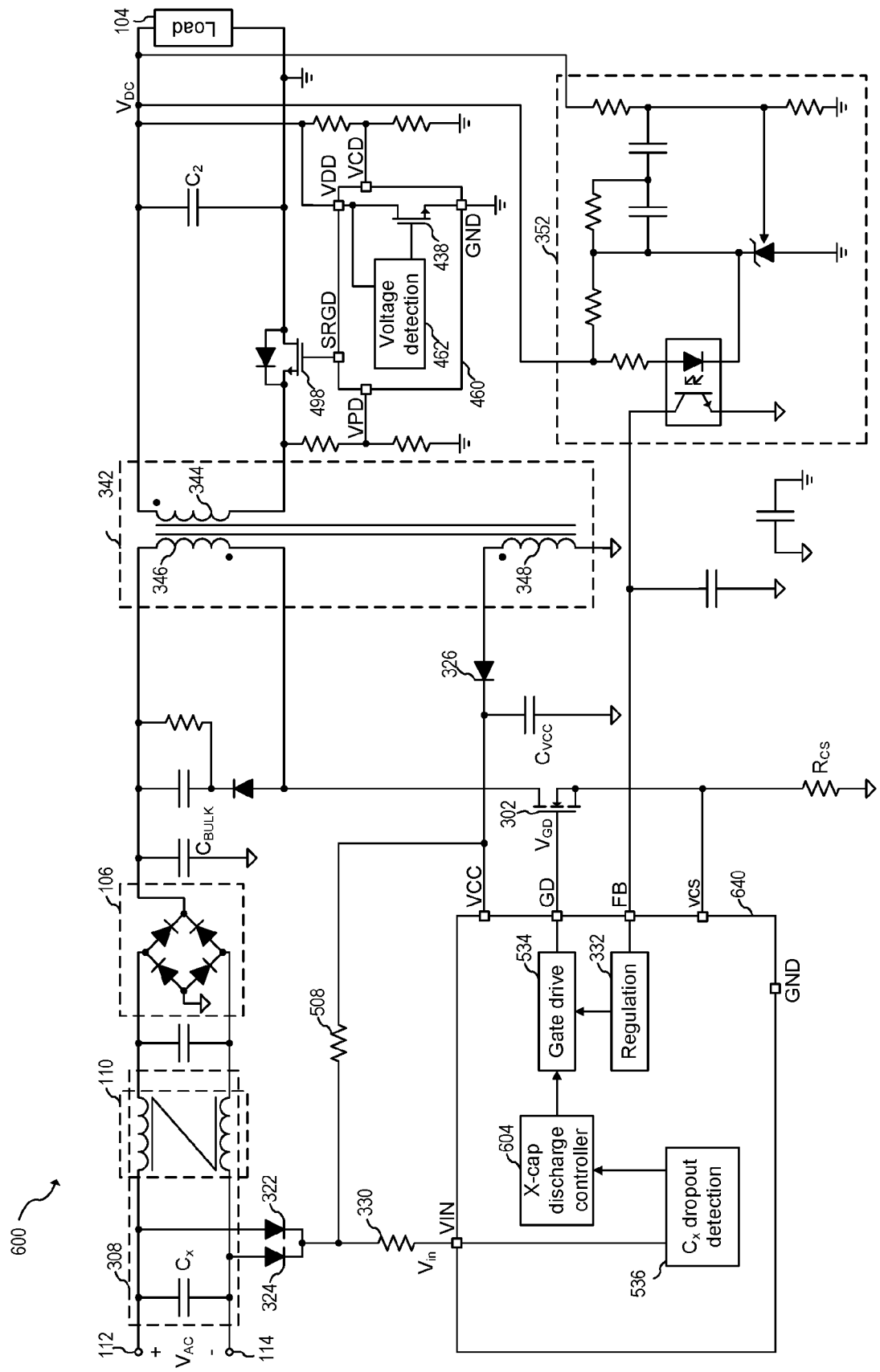
FIG. 6 illustrates SMPS 600 according to an embodiment of the present invention.

FIG. 6 illustrates SMPS 600 according to an embodiment of the present invention. Similarly to SMPS 500, SMPS 600 is configured to quickly detect when AC power has been disconnected while minimizing or eliminating touch current. After SMPS 600 detects that AC power has been disconnected, SMPS 600 safely discharges capacitor $C_x$ through switching transistor 302. SMPS 600 may maintain low standby power consumption and may avoid using high voltage devices inside IC 640.

SMPS 600 may operate in a similar manner as SMPS 500 during start-up and normal operation, and may implement method 321 and 335 for detecting when AC power has been disconnected. SMPS 600, however, includes synchronous rectifier controller IC 460 and, therefore, may implement method 451 to discharge capacitor $C_x$ after AC power disconnection has been detected.

One general aspect includes a method of operating a switch-mode power supply, the method including: receiving a dropout detection signal from a dropout detection circuit coupled to an input of the switch-mode power supply; and discharging an input capacitor coupled to the input of the switch-mode power supply via a switching transistor having a first load path coupled to the input capacitor through an inductive element.

Implementations may include one or more of the following features. The method where the dropout detection circuit is coupled to the input capacitor through a first resistor in series with a diode. The method where discharging the input capacitor includes turning on the switching transistor. The method further including turning on a first transistor coupled in series with the switching transistor when receiving the dropout detection signal. The method where: the turning on the switching transistor includes fully turning on the switching transistor, and the method further includes limiting a current flowing through the first transistor to a predetermined value. The method where the inductive element includes a first winding of a transformer, and the method further includes: during start-up, keeping the first transistor off, and turning on the switching transistor; and during normal operation, turning on the first transistor. The method further including: during start-up, allowing a current flowing through the switching transistor to charge a capacitor coupled to a first input of the switch-mode power supply; and during normal operation, allowing a current flowing through a third winding of the transformer to charge the capacitor coupled to the first input of the switch-mode power supply. The method where turning on the switching transistor during start-up includes charging a gate of the switching transistor through a first resistor. The method where the first transistor includes a normally-off transistor, and the keeping the first transistor off includes charging a gate of the first transistor to a turn-off voltage. The method further including limiting a current flowing through the first load path to a predetermined value after receiving the dropout detection signal. The method further including: monitoring a first voltage at a terminal of the input capacitor; and generating the dropout detection signal based on the monitored first voltage. The method further including generating the dropout detection signal from the dropout detection circuit, where the generating the dropout detection signal includes: receiving a first peak voltage based on an input voltage between inputs of the switch-mode power supply; receiving a second peak voltage based on the input voltage, where the second peak voltage happens in an AC cycle after the first peak voltage; receiving a third peak voltage based on the input voltage, where the third peak voltage happens in an AC cycle after the second peak voltage; and generating the dropout detection signal when the third peak voltage is smaller than the second peak voltage, and the second peak voltage is smaller than the first peak voltage. The method further including generating the dropout detection signal from the dropout detection circuit, where the generating the dropout detection signal includes: receiving a first peak voltage based on an input voltage between inputs of the switch-mode power supply; receiving a second peak voltage based on the input voltage, where the second peak voltage happens in an ac cycle after the first peak voltage; receiving a third peak voltage based on the input voltage, where the third peak voltage happens in an ac cycle after the second peak voltage; and generating the dropout detection signal when the third peak voltage is smaller than the second peak voltage multiplied a factor k, and the second peak voltage is smaller than the first peak voltage multiplied by the factor k, or when the first peak voltage is smaller than a predetermined value. The method where the factor k is a number between 0.9 and 0.98. The method further including generating the dropout detection signal from the dropout detection circuit, where the generating the dropout detection signal includes: receiving a first peak voltage based on an input voltage between inputs of the switch-mode power supply; receiving a second peak voltage based on the input voltage, where the second peak voltage happens in an ac cycle after the first peak voltage; receiving a third peak voltage based on the input voltage, where the third peak voltage happens in an ac cycle after the second peak voltage; receiving a fourth peak voltage based on the input voltage, where the fourth peak voltage happens in an ac cycle after the third peak voltage; and generating the dropout detection signal when the fourth peak voltage is smaller than the third peak voltage multiplied a factor k, the third peak voltage is smaller than the second peak voltage multiplied a factor k, and the second peak voltage is smaller than the first peak voltage multiplied by the factor k. The method where the inductive element includes a first winding of a transformer, the method further including: detecting an overvoltage condition in a second circuit path coupled to a second winding of the transformer; turning off a synchronous rectifier transistor coupled to the second winding of the transformer after detecting the overvoltage condition; and turning on a second transistor coupled to the second circuit path after detecting an overvoltage condition. The method further including turning on and off the switching transistor.

Another general aspect includes a circuit including: a first gate drive circuit configured to provide a first signal to a switching transistor having a first load path coupled to an input capacitor of the circuit through an inductive element; and a discharge controller coupled to the first gate drive circuit, the discharge controller configured to receive a dropout detection signal from a discharge condition detector circuit, and turn on the switching transistor after receiving the dropout detection signal.

Implementations may include one or more of the following features. The circuit further including the discharge condition detector circuit, where the discharge condition detector circuit is configured to monitor a first voltage at a first terminal configured to be coupled to the input capacitor through a resistor in series with a diode. The circuit further including the resistor, where the resistor has a value of 20 MΩ. The circuit where the discharge condition detector circuit is further configured to monitor the first voltage continuously. The circuit further including the switching transistor. The circuit where the inductive element includes an inductor. The circuit further including a first transistor having a second load path coupled in series with the first load path. The circuit where the inductive element includes a first winding of a transformer, the circuit further including: a circuit path allowing current to flow from the first load path into an input capacitor; and a circuit path allowing current to flow from a third winding of the transformer into the input capacitor. The circuit where the inductive element includes a first winding of a transformer, the circuit further including: an overvoltage detector coupled to a second winding of the transformer; and a second transistor having a third load path coupled to the second winding of the transformer.

Yet another general aspect includes a switch-mode power supply including a first integrated circuit, where the first integrated circuit includes: a dropout detection circuit configured to be coupled to an input of the switch-mode power supply, the dropout detection circuit configured to detect a dropout of an AC input voltage at the input of the switch-mode power supply; and a first gate drive circuit coupled to the dropout detection circuit, the first gate drive circuit configured to activate a switching transistor coupled to the input of the switch-mode power supply via a first inductor upon the dropout detection circuit detecting the dropout of the AC input voltage, where an input capacitor coupled to the input of the switch-mode power supply is discharged via the switching transistor.

Implementations may include one or more of the following features. The switch-mode power supply where the first integrated circuit further includes: a first transistor with a second load path coupled in series with the switching transistor. The switch-mode power supply where the first integrated circuit further includes a first current regulator circuit configured to regulate a current flowing through the first transistor. The switch-mode power supply where the first inductor includes a first winding of a transformer, the switch-mode power supply further including a second integrated circuit, where the second integrated circuit includes: a second gate drive circuit configured to provide a signal to a synchronous rectifier transistor having a third load path coupled to a second winding of the transformer; an overvoltage detector configured to monitor a voltage at a first terminal coupled to the second winding of the transformer; and a second transistor configured to be coupled to the first terminal. The switch-mode power supply where the first gate drive circuit is connected to the dropout detection circuit. The switch-mode power supply where the dropout detection circuit includes a first current mirror configured to monitor continuously a first current flowing through a first resistor. The switch-mode power supply where the first integrated circuit further includes a second current regulator circuit configured to regulate a current flowing through the switching transistor. The switch-mode power supply where the first inductor includes a first winding of a transformer, the switch-mode power supply further including a second integrated circuit, where the second integrated circuit includes: a second gate drive circuit configured to provide a signal to a synchronous rectifier transistor having a third load path coupled to a second winding of the transformer; an overvoltage detector configured to monitor a voltage at a first terminal coupled to the second winding of the transformer; and a second transistor configured to be coupled to the first terminal. The switch-mode power supply where the dropout detection circuit includes: a first transistor with a load path coupled in series with a first resistor; and a second transistor coupled to the first transistor in a current mirror configuration. The switch-mode power supply where the dropout detection circuit further includes: a third transistor coupled in series with a first resistor; and a first amplifier with a first output coupled to a gate of the third transistor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a switch-mode power supply, the method comprising:
   receiving a dropout detection signal from a dropout detection circuit coupled to an input of the switch-mode power supply;
   detecting, with the dropout detection circuit, a dropout of an AC input voltage at the input of the switch-mode power supply; and
   discharging an input capacitor coupled to the input of the switch-mode power supply via a switching transistor having a first load path coupled to the input capacitor through an inductive element based on the received dropout detection signal by activating the switching transistor with a gate drive circuit coupled to a control node of the switching transistor.

2. The method of claim 1, wherein the dropout detection circuit is coupled to the input capacitor through a first resistor in series with a diode.

3. The method of claim 1, wherein discharging the input capacitor comprises turning on the switching transistor.

4. The method of claim 3, further comprising turning on a first transistor coupled in series with the switching transistor when receiving the dropout detection signal.

5. The method of claim 4, wherein:
the turning on of the switching transistor comprises fully turning on the switching transistor, and
the method further comprises limiting a current flowing through the first transistor to a predetermined value.

6. The method of claim 4, wherein the inductive element comprises a first winding of a transformer, and the method further comprises:
during start-up,
keeping the first transistor off, and
turning on the switching transistor; and
during normal operation,
turning on the first transistor.

7. The method of claim 6, further comprising:
during start-up, allowing a current flowing through the switching transistor to charge a capacitor coupled to a first input of the switch-mode power supply; and
during normal operation, allowing a current flowing through a third winding of the transformer to charge the capacitor coupled to the first input of the switch-mode power supply.

8. The method of claim 6, wherein turning on the switching transistor during start-up comprises charging a gate of the switching transistor through a first resistor.

9. The method of claim 6, wherein the first transistor comprises a normally-off transistor, and the keeping the first transistor off comprises charging a gate of the first transistor to a turn-off voltage.

10. The method of claim 1, further comprising limiting a current flowing through the first load path to a predetermined value after receiving the dropout detection signal.

11. The method of claim 1, further comprising:
monitoring a first voltage at a terminal of the input capacitor; and
generating the dropout detection signal based on the monitored first voltage.

12. The method of claim 1, further comprising generating the dropout detection signal from the dropout detection circuit, wherein the generating the dropout detection signal comprises:
receiving a first peak voltage based on an input voltage between inputs of the switch-mode power supply;
receiving a second peak voltage based on the input voltage, wherein the second peak voltage happens in an AC cycle after the first peak voltage;
receiving a third peak voltage based on the input voltage, wherein the third peak voltage happens in an AC cycle after the second peak voltage; and
generating the dropout detection signal when the third peak voltage is smaller than the second peak voltage, and the second peak voltage is smaller than the first peak voltage.

13. The method of claim 1, further comprising generating the dropout detection signal from the dropout detection circuit, wherein the generating the dropout detection signal comprises:
receiving a first peak voltage based on an input voltage between inputs of the switch-mode power supply;
receiving a second peak voltage based on the input voltage, wherein the second peak voltage happens in an AC cycle after the first peak voltage;
receiving a third peak voltage based on the input voltage, wherein the third peak voltage happens in an AC cycle after the second peak voltage; and
generating the dropout detection signal when the third peak voltage is smaller than the second peak voltage multiplied a factor k, and the second peak voltage is smaller than the first peak voltage multiplied by the factor k, or when the first peak voltage is smaller than a predetermined value.

14. The method of claim 13, wherein the factor k is a number between 0.9 and 0.98.

15. The method of claim 1, further comprising generating the dropout detection signal from the dropout detection circuit, wherein the generating the dropout detection signal comprises:
receiving a first peak voltage based on an input voltage between inputs of the switch-mode power supply;
receiving a second peak voltage based on the input voltage, wherein the second peak voltage happens in an AC cycle after the first peak voltage;
receiving a third peak voltage based on the input voltage, wherein the third peak voltage happens in an AC cycle after the second peak voltage;
receiving a fourth peak voltage based on the input voltage, wherein the fourth peak voltage happens in an AC cycle after the third peak voltage; and
generating the dropout detection signal when the fourth peak voltage is smaller than the third peak voltage multiplied a factor k, the third peak voltage is smaller than the second peak voltage multiplied a factor k, and the second peak voltage is smaller than the first peak voltage multiplied by the factor k.

16. The method of claim 1, wherein the inductive element comprises a first winding of a transformer, the method further comprising:
detecting an overvoltage condition in a second circuit path coupled to a second winding of the transformer;
turning off a synchronous rectifier transistor coupled to the second winding of the transformer after detecting the overvoltage condition; and
turning on a second transistor coupled to the second circuit path after detecting an overvoltage condition.

17. The method of claim 1, further comprising turning on and off the switching transistor.

18. A circuit comprising:
a first gate drive circuit configured to provide a first signal to a switching transistor having a first load path coupled to an input capacitor of the circuit through an inductive element;
a discharge condition detector circuit configured to
receive a first peak voltage based on a first voltage between inputs terminals of the input capacitor,
receive a second peak voltage based on the first voltage, wherein the second peak voltage happens in an AC cycle after the first peak voltage,
receive a third peak voltage based on the first voltage, wherein the third peak voltage happens in an AC cycle after the second peak voltage, and
generate a dropout detection signal when the third peak voltage is smaller than the second peak voltage multiplied a factor k, and the second peak voltage is smaller than the first peak voltage multiplied by the factor k, or when the first peak voltage is smaller than a predetermined value; and
a discharge controller coupled to the first gate drive circuit, the discharge controller configured to receive the dropout detection signal from the discharge condition detector circuit, and turn on the switching transistor with the first gate drive circuit after receiving the dropout detection signal.

19. The circuit of claim 18, wherein the discharge condition detector circuit is configured to monitor the first voltage via a resistor in series with a diode.

20. The circuit of claim 19, further comprising the resistor, wherein the resistor has a value of 20 MΩ or higher.

21. The circuit of claim 19, wherein the discharge condition detector circuit is further configured to monitor the first voltage continuously.

22. The circuit of claim 18, further comprising the switching transistor.

23. The circuit of claim 18, wherein the inductive element comprises an inductor.

24. The circuit of claim 18, further comprising a first transistor having a second load path coupled in series with the first load path.

25. The circuit of claim 24, wherein the inductive element comprises a first winding of a transformer, the circuit further comprising:
a circuit path allowing current to flow from the first load path into an input capacitor; and
a circuit path allowing current to flow from a third winding of the transformer into the input capacitor.

26. The circuit of claim 18, wherein the inductive element comprises a first winding of a transformer, the circuit further comprising:
an overvoltage detector coupled to a second winding of the transformer; and
a second transistor having a third load path coupled to the second winding of the transformer.

27. The circuit of claim 18, wherein the factor k is a number between 0.9 and 0.98.

28. The circuit of claim 18, wherein the input capacitor is configured to be discharged via the switching transistor after receiving the dropout detection signal.

29. A switch-mode power supply comprising a first integrated circuit, wherein the first integrated circuit comprises:
a dropout detection circuit configured to be coupled to an input of the switch-mode power supply, the dropout detection circuit configured to detect a dropout of an AC input voltage at the input of the switch-mode power supply; and
a first gate drive circuit coupled to the dropout detection circuit, the first gate drive circuit configured to activate a switching transistor coupled to the input of the switch-mode power supply via a first inductor upon the dropout detection circuit detecting the dropout of the AC input voltage, wherein an input capacitor coupled to the input of the switch-mode power supply is discharged via the switching transistor.

30. The switch-mode power supply of claim 29, wherein the first integrated circuit further comprises:

a first transistor with a second load path coupled in series with the switching transistor.

31. The switch-mode power supply of claim 30, wherein the first integrated circuit further comprises a first current regulator circuit configured to regulate a current flowing through the first transistor.

32. The switch-mode power supply of claim 30, wherein the first inductor comprises a first winding of a transformer, the switch-mode power supply further comprising a second integrated circuit, wherein the second integrated circuit comprises:
a second gate drive circuit configured to provide a signal to a synchronous rectifier transistor having a third load path coupled to a second winding of the transformer;
an overvoltage detector configured to monitor a voltage at a first terminal coupled to the second winding of the transformer; and
a second transistor configured to be coupled to the first terminal.

33. The switch-mode power supply of claim 30, wherein the first gate drive circuit is connected to the dropout detection circuit.

34. The switch-mode power supply of claim 29, wherein the dropout detection circuit comprises a first current mirror configured to monitor continuously a first current flowing through a first resistor.

35. The switch-mode power supply of claim 34, wherein the first integrated circuit further comprises a second current regulator circuit configured to regulate a current flowing through the switching transistor.

36. The switch-mode power supply of claim 34, wherein the first inductor comprises a first winding of a transformer, the switch-mode power supply further comprising a second integrated circuit, wherein the second integrated circuit comprises:
a second gate drive circuit configured to provide a signal to a synchronous rectifier transistor having a third load path coupled to a second winding of the transformer;
an overvoltage detector configured to monitor a voltage at a first terminal coupled to the second winding of the transformer; and
a second transistor configured to be coupled to the first terminal.

37. The switch-mode power supply of claim 29, wherein the dropout detection circuit comprises:
a first transistor with a load path coupled in series with a first resistor; and
a second transistor coupled to the first transistor in a current mirror configuration.

38. The switch-mode power supply of claim 37, wherein the dropout detection circuit further comprises:
a third transistor coupled in series with a first resistor; and
a first amplifier with a first output coupled to a gate of the third transistor.

* * * * *